(12) United States Patent
Marseglia et al.

(10) Patent No.: US 11,179,751 B2
(45) Date of Patent: Nov. 23, 2021

(54) PACKAGE HANDLING AND SORTING SYSTEM

(71) Applicant: InTunes Products, LLC, Webster, NY (US)

(72) Inventors: Michael Marseglia, Webster, NY (US); Michael Fisher, Webster, NY (US); Scott Baube, Webster, NY (US); Christopher Angevine, Webster, NY (US); Greggory Bartoo, Webster, NY (US); Dennis O'Neill, Webster, NY (US); Austin Smith, Webster, NY (US)

(73) Assignee: InTunes Products, LLC, Webster, NY (US)

( * ) Notice: Subject to any disclaimer, the term of this patent is extended or adjusted under 35 U.S.C. 154(b) by 0 days.

(21) Appl. No.: 17/090,362

(22) Filed: Nov. 5, 2020

(65) Prior Publication Data

US 2021/0260627 A1 Aug. 26, 2021

Related U.S. Application Data

(63) Continuation of application No. 16/902,974, filed on Jun. 16, 2020.
(Continued)

(51) Int. Cl.
*B07C 3/08* (2006.01)
*B07C 5/36* (2006.01)
(Continued)

(52) U.S. Cl.
CPC .............. *B07C 3/08* (2013.01); *B07C 5/36* (2013.01); *B25J 9/0093* (2013.01); *B25J 9/1679* (2013.01);
(Continued)

(58) Field of Classification Search
CPC .......................... B07C 2501/0063; B07C 3/08
See application file for complete search history.

(56) References Cited

U.S. PATENT DOCUMENTS

| 2,936,062 | A | 5/1960 | Wilcox |
| 3,484,655 | A | 12/1969 | Peltier |

(Continued)

FOREIGN PATENT DOCUMENTS

| CN | 107651350 | 2/2018 |
| DE | 102011107617 | 2/2012 |

(Continued)

OTHER PUBLICATIONS

Bastian Solutions, a Toyota Advanced Logistics company, "Pop-Up Transfers", accessed Apr. 29, 2020.
(Continued)

*Primary Examiner* — Thomas Randazzo
(74) *Attorney, Agent, or Firm* — Woods Oviatt Gilman LLP; Katherine H. McGuire, Esq.

(57) ABSTRACT

A package sort cell includes a robot with an end of arm tool for transporting packages from an in-feed conveyor to a selected one of a plurality of out-feed conveyors or bins, the robot receiving instruction from the package reader as to which of the plurality of conveyors or bins to hand-off the package. An end of arm tool may be in the configuration of a conveyor which may be aligned with the out-feed conveyor on a bottom up movement. The end of arm tool may also be in the configuration of a hanging carriage frame suspending a conveyor in a top down movement. A worker platform may be provided which may be movable between in-use and out-of-use positions whereby upon robot downtime, the platform may move into the in-use position for a worker to temporarily takeover the transfer functions of the robot. A plurality of sort cells may be arranged in side by side relation adjacent a like plurality of package delivery
(Continued)

points (e.g., truck bays) and include diverter conveyors to allow diversion of a selected quantity of packages from one cell to an adjacent cell when the adjacent cell has no associated package delivery occurring at that time.

21 Claims, 43 Drawing Sheets

Related U.S. Application Data

(60) Provisional application No. 63/025,569, filed on May 15, 2020, provisional application No. 62/981,568, filed on Feb. 26, 2020.

(51) Int. Cl.
　　*B25J 9/00*　　　(2006.01)
　　*B25J 9/16*　　　(2006.01)
　　*B65G 47/90*　　(2006.01)
　　*B25J 15/06*　　(2006.01)

(52) U.S. Cl.
　　CPC .......... *B25J 15/0616* (2013.01); *B65G 47/90* (2013.01); *B07C 2501/0063* (2013.01); *B65G 2201/0285* (2013.01)

(56) References Cited

U.S. PATENT DOCUMENTS

| | | | |
|---|---|---|---|
| 3,552,546 A | 1/1971 | Rath | |
| 4,174,774 A | 11/1979 | Bourgeois | |
| 4,512,687 A | 4/1985 | Enns | |
| 4,526,265 A | 7/1985 | Enns | |
| 4,613,278 A | 9/1986 | Bilsing | |
| 5,174,430 A | 12/1992 | Ebira | |
| 5,868,238 A | 2/1999 | Bonnet | |
| 5,953,234 A | 9/1999 | Singer et al. | |
| 5,979,606 A | 11/1999 | Wheeler | |
| 6,139,240 A | 10/2000 | Ando | |
| 6,401,936 B1 | 6/2002 | Isaacs et al. | |
| 6,412,621 B1 | 7/2002 | De Vree et al. | |
| 6,644,459 B2 | 11/2003 | van Leeuwen et al. | |
| 6,971,126 B1 | 12/2005 | Kluckhuhn | |
| 8,167,120 B2 | 5/2012 | Russell et al. | |
| 8,272,496 B2 | 9/2012 | Itoh et al. | |
| 8,280,548 B2 | 10/2012 | Zuber et al. | |
| 8,397,898 B2 | 3/2013 | Buchmann et al. | |
| 8,684,169 B2 | 4/2014 | Itoh et al. | |
| 8,733,810 B2 | 5/2014 | Oda | |
| 9,359,150 B2 | 6/2016 | Jodoin et al. | |
| 9,365,361 B1 | 6/2016 | Skarlupka | |
| 9,469,486 B2 | 10/2016 | German | |
| 9,475,653 B2 | 10/2016 | Dugat | |
| 9,481,516 B1 | 11/2016 | Kraus et al. | |
| 9,539,729 B2 | 1/2017 | Tanaka et al. | |
| 9,617,083 B2 | 4/2017 | Itoh et al. | |
| 9,741,009 B2 | 8/2017 | Berghorn et al. | |
| 9,878,857 B2 | 1/2018 | Itoh et al. | |
| 9,988,218 B2 | 6/2018 | Dugat et al. | |
| 10,016,902 B2 | 7/2018 | Podnar | |
| 10,301,122 B2 | 5/2019 | Moroni et al. | |
| 10,301,123 B2 | 5/2019 | Itoh et al. | |
| 10,308,442 B2 | 6/2019 | Itoh et al. | |
| 10,351,353 B1 | 7/2019 | Skarlupka | |
| 10,464,217 B1 | 11/2019 | Phan et al. | |
| 10,583,986 B2 | 3/2020 | Wagner et al. | |
| 10,646,991 B2 | 5/2020 | Wagner et al. | |
| 10,906,188 B1* | 2/2021 | Sun | B25J 9/1664 |
| 2015/0259156 A1 | 9/2015 | Henry et al. | |
| 2016/0199884 A1* | 7/2016 | Lykkegaard | B25J 9/0093 700/223 |
| 2017/0157648 A1* | 6/2017 | Wagner | G05B 19/4189 |
| 2018/0056335 A1* | 3/2018 | Ogusu | B07C 5/36 |
| 2018/0105363 A1 | 4/2018 | Lisso et al. | |
| 2018/0273297 A1* | 9/2018 | Wagner | B65G 1/0478 |
| 2018/0333749 A1 | 11/2018 | Wagner et al. | |
| 2019/0270197 A1* | 9/2019 | Wagner | B25J 9/1669 |
| 2019/0270537 A1 | 9/2019 | Amend, Jr. et al. | |
| 2019/0337720 A1 | 11/2019 | Miette et al. | |
| 2020/0033883 A1 | 1/2020 | Theobald | |
| 2020/0078935 A1 | 3/2020 | Kimura et al. | |
| 2020/0087082 A1 | 3/2020 | Schaarschmidt | |
| 2020/0103882 A1 | 4/2020 | Sullivan et al. | |
| 2020/0180874 A1* | 6/2020 | Mattern | B25J 15/00 |
| 2021/0009362 A1* | 1/2021 | Grupp | B07C 5/36 |
| 2021/0047122 A1* | 2/2021 | Issing | B07C 3/08 |

FOREIGN PATENT DOCUMENTS

| | | |
|---|---|---|
| EP | 2433761 | 3/2012 |
| EP | 3181308 | 6/2017 |
| FR | 2836136 | 8/2003 |
| GB | 2476793 | 7/2011 |
| JP | 1261103 | 10/1989 |
| JP | 06263203 | 9/1994 |
| JP | 2018008775 | 1/2018 |
| KR | 20110034493 | 4/2011 |
| WO | 2007120438 | 10/2007 |
| WO | 202001137 | 1/2020 |
| WO | 2020004920 | 1/2020 |

OTHER PUBLICATIONS

Dorner, "Transfer between Lines with Pop-up Conveyors", https://www.dornerconveyors.com/, Nov. 3, 2015.
Manual parcel sorting for loading and unloading processes, https://www.sick.com/de/en/industries/courier-express-parcel-and-postal/parcel-and-flats-sorting/unloadinginbound/manual-parcel-sorting-for-loading-and-unloading-processes/c/p360453.
Michalos, George, et al. "A method for planning human robot shared tasks" CIRP journal of manufacturing science and technology 22 (2018): 76-90.
The Omron TM Collaborative Robot—Human and Machine in Perfect Harmony, http://www.ia.omron.com/products/family/3739/.
Brown, Terry. "Choosing a Singulation Method", https://parcelindustry.com/by-author-1323-1.html, Jun. 14, 2017.
Darby Equipment Company, "Darby Pipe Roller Cradle PRC48-60D", https://www.darbyequip.com/prc4860dspecs.html, accessed May 1, 2020.
Premier Tech, BLOG Premier Tech, "Is it now the time to consider a robot palletizer?", https://www.ptchronos.com/en-ca/blog/is-now-the-time-to-consider-a-robot-palletizer, Aug. 20, 2015.
International Search Report and Written Opinion (ISR/WO) of International Searching Authority dated Jun. 25, 2021 in connection with PCT/US2021/019907.

* cited by examiner

PACKAGE HANDLING AND SORTING SYSTEM

BACKGROUND OF THE INVENTION

The present invention relates to package handling systems. More particularly, the invention relates to robotic package handling systems for sorting packages of varying shapes and sizes according to routing information on the package.

Delivery of parcels or packages from their origin to their final destination may require package routing transfer stations, and particularly so for packages travelling long distances. With billions of packages being transported around the globe each day the business of package transport is a significant industry. Such deliveries typically involve multiple transportation methodologies including air, truck, train, etc., with the packages having a destination address printed either directly thereon or on a label affixed to the package.

A first segment of the delivery route may require a routing transfer station where the packages arrive at the routing transfer station as a generally unsorted group of packages of varying sizes and shapes. The packages may arrive at the transfer station by truck, for example. The packages must be offloaded from the truck and passed to a sorting station where the packages are individually interrogated for routing information. The interrogation may be human and/or electronic (e.g., any type of detector/reader such as bar or other code scanner, optical machine vision print reader, RFID reader, etc.). The routing interrogator identifies the second segment of the delivery route the package is to take which is one of multiple routes that lead from the routing transfer station to the next destination which may be the final destination or a third routing transfer station. Thus, at the routing transfer station, the packages are sorted according to their next route with each route having its own route path hand off point.

These routing transfer stations are typically manned stations where one or more workers stand along a worker aisle which extends between the unsorted package delivery locations and the route sorted package hand off locations. The workers are trained to retrieve the packages one at a time from the route interrogator which tells the worker which one of the plurality of routing paths to hand off the package. The workers thus manually and repeatedly perform "pick and place" as they pick a package from the delivery location and then place each package at its correct route path, turning their bodies back and forth as they repeatedly pick and place packages. This is typically high volume, fast paced work which is extremely physically demanding. As such, worker fatigue and injury leads to a high rate of worker turnover. While package handling systems have generally improved over the past decade, there remains a need for an improved package handling system that addresses these and other shortcomings of present day package handing systems.

SUMMARY OF THE INVENTION

The present invention provides various embodiments of package handling systems that address the above needs.

In one embodiment, a package handling system is configured as a package sort cell having an optional protective frame including a robot having a multi axis arm with a free end typically referred to as the "end of arm" to which a variety of different tools may be mounted depending on the task.

One or more package sort cells may be placed along a package sort aisle extending between one or more respective unsorted package delivery locations and a plurality of package route paths.

The robot may be fitted with an end of arm tool ("EOAT") operable to pick and place a package from the unsorted package delivery location to the appropriate sorted route path. The end of arm tool may be of any desired type. In one embodiment, the end of arm tool is a belt conveyor. The belt conveyor may include vacuum assist to maintain the package on the conveyor during the pick and place package transfer process.

The cell may include a platform adjacent the frame on which a worker may stand to perform the package pick and place function when necessary. The platform may be movable between an in-use position and a stored position. In one particular embodiment, the robot is mounted in a location such that the multi axis arm extends through an opening in the frame as the robot end of arm tool picks and places a package from the delivery location to the correct route path. Should the robot have downtime, the robot may be put into a storage position close to its base and the worker platform may be moved to an in-use position. The in-use position may extend over the previously open area of the frame where the robot end of arm tool extended when operating. As such, a worker may take over and perform the pick and place operation while the robot is in downtime by standing on the platform.

In one embodiment, detection of robot malfunction may initiate a software program routine operating in conjunction with the package sort cell where the program instructs the robot to collapse to the storage position and the platform to move to the in-use position. The program may include functionality alerting a worker (e.g., via a smart phone app) that a robot malfunction has been detected. A graphic user interface (GUI) may be located on or adjacent the cell for manual worker control of the cell as needed (e.g., when the robot is not responding to the "move to storage position" instruction and/or the platform is not responding to the "move to in-use position" instruction).

In the above embodiment, the robot may be mounted to or adjacent the base of the frame where the robot end of arm is primarily located below the pick and place package. In another embodiment, the robot may be mounted to an upper extent of the frame where the robot end of arm is located primarily above the pick and place package. In yet another embodiment, the robot may be mounted between the upper and lower extents of the frame and the robot end of arm may be located primarily laterally of the pick and place package.

A package address route reader may be mounted to or adjacent the frame in a location between the unsorted package delivery location and the package pick location. In another embodiment, the route reader may be mounted to the robot adjacent the end of arm tool where the route is read as the robot picks the package.

The package sort cell may be modular in the respect that two or more package sort cells may be placed in side-by-side relation along an aisle extending between an unsorted package delivery location and a plurality of route paths. For example, an unsorted package delivery location may be associated with a respective package sort cell. Each sort cell is associated with a plurality of route paths such that the package may be placed at the correct route path in accordance with the interrogated route information on the package.

The sort cells may be connected to an appropriate power source necessary for the functionality of the electronic components associated with each cell (e.g., robot, route reader, computer controls, etc.). In a particularly advantageous embodiment, the cells are equipped with built-in electrical connections that allow quick connection to the power source. As such, a main electrical source may power all cells such that each cell need not have its own dedicated power source. For example, an elongated electrical conduit may extend along the sort cell aisle and each cell may "plug into" the conduit. Cells may thus be quickly added, replaced or removed from the sort aisle as needed.

For the sake of description, one exemplary package sorting environment is described where truck trailers containing unsorted packages of varying shapes, sizes and weights are backed up to a respective package sort cell. A worker in the truck trailer loads the packages located in the trailer onto a conveyor which moves the packages out of the trailer to the sort cell. In a large package routing facility, many tractor trailers are constantly arriving and leaving the facility to drop off packaging for sorting and/or pick up sorted packages for delivering to their next transit location (e.g., the package final destination or anther package sorting location). The trailers may be arranged in side-by-side relation adjacent a respective package sort cell located in the sort aisle. On the other side of the sort aisle is the plurality of route paths associated with each sort cell. In one possible embodiment, there are four different route paths associated with each sort cell. The sort cell operates to pick and place each package unloaded from the trailer to the particular route path which is dictated by the route reader associated with the sort cell.

DETAILED DESCRIPTION

Figure 1:
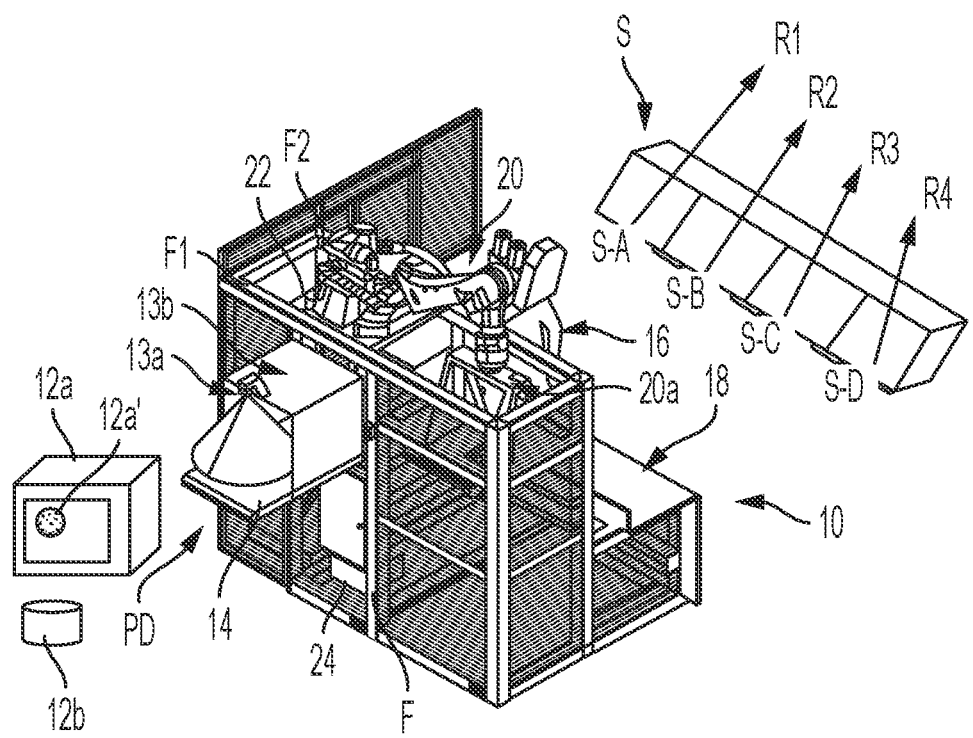
FIG. 1 is a perspective view of one embodiment of the invention.

A first embodiment of a package handling system in accordance with the invention is seen in FIGS. 1-7 configured as a package sort cell 10 having a frame F with a robot 20. A package handling tool 20a may be mounted to the free end 20b of a multi axis arm 20d of the robot. The robot arm free end 20b may be configured to allow interchangeability of the package handling tool 20a with other package handling tools which may be of other configurations.

Figure 1A:
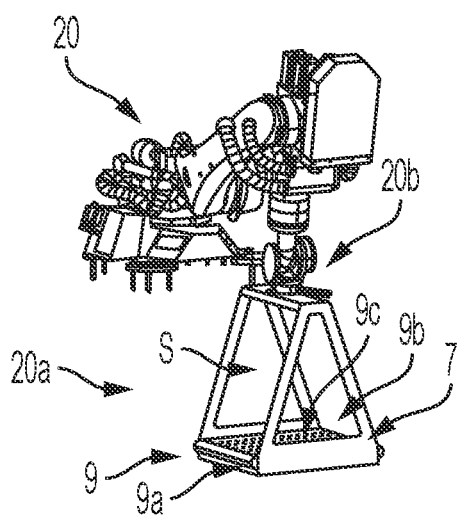
FIG. 1A is a perspective view of the robot and an end of art tool (EOAT) in the configuration of a hanging carriage type of conveyor platform.
Figure 2:
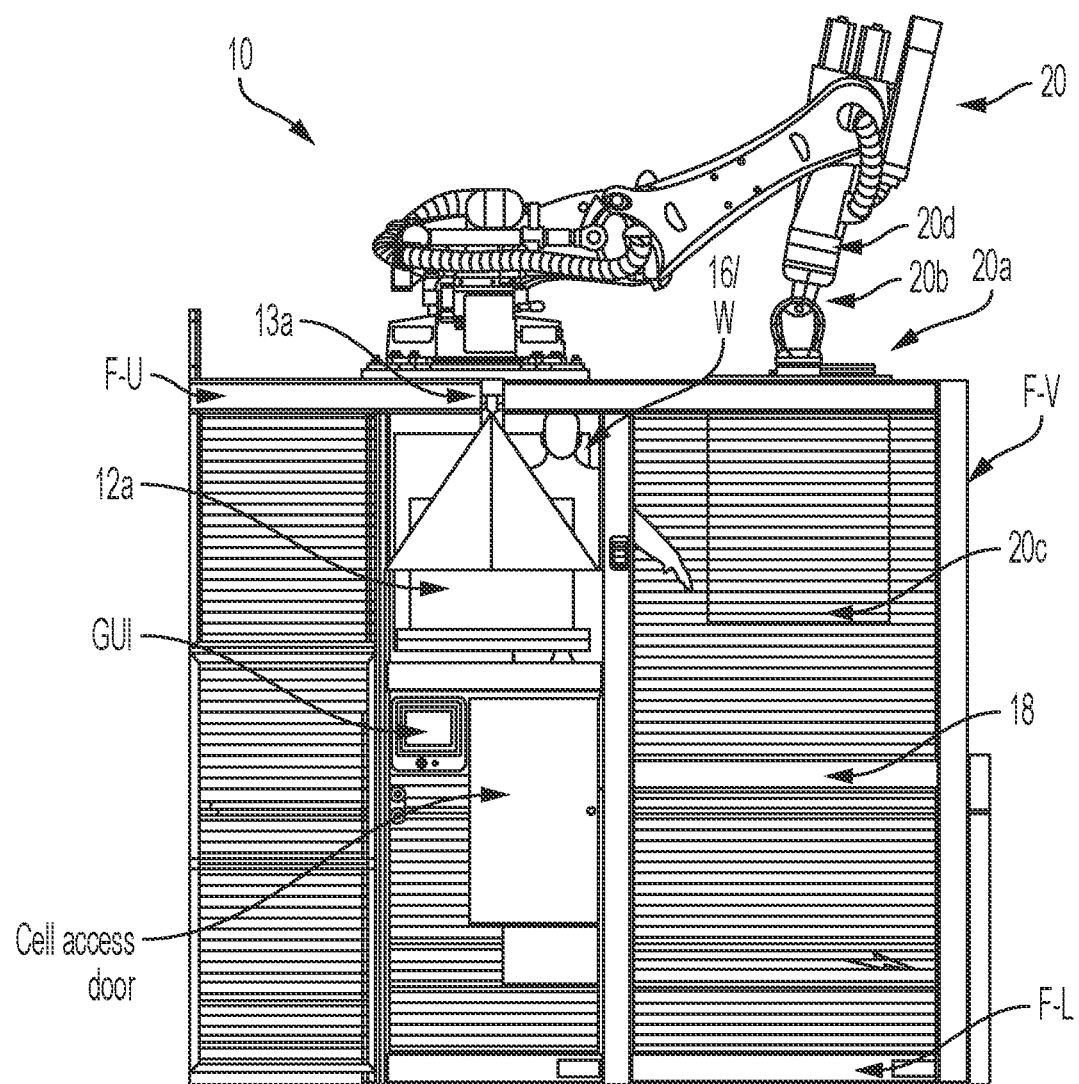
FIG. 2 is a front elevational view thereof.
Figure 3:
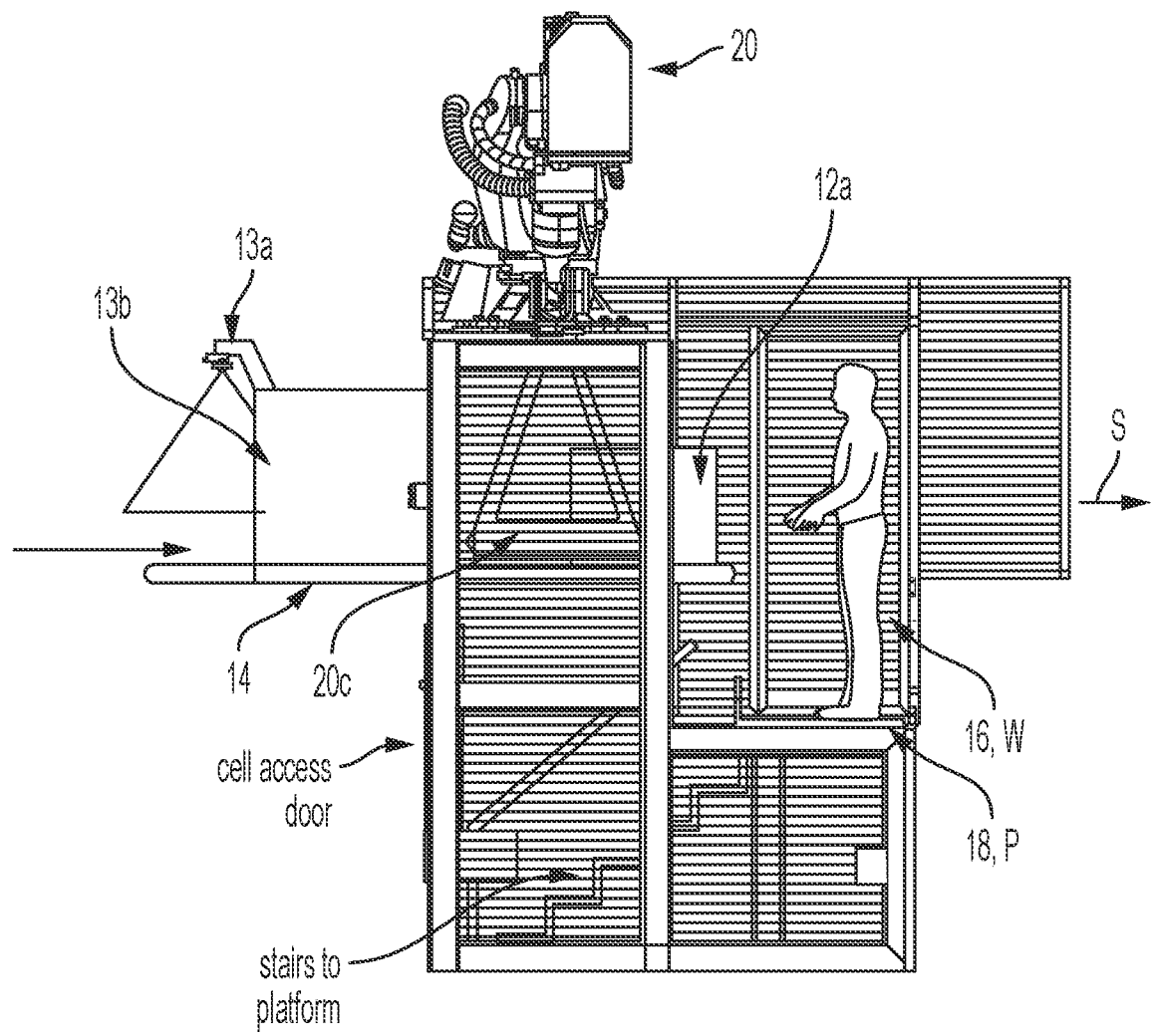
FIG. 3 is a side elevational view thereof.
Figure 4:
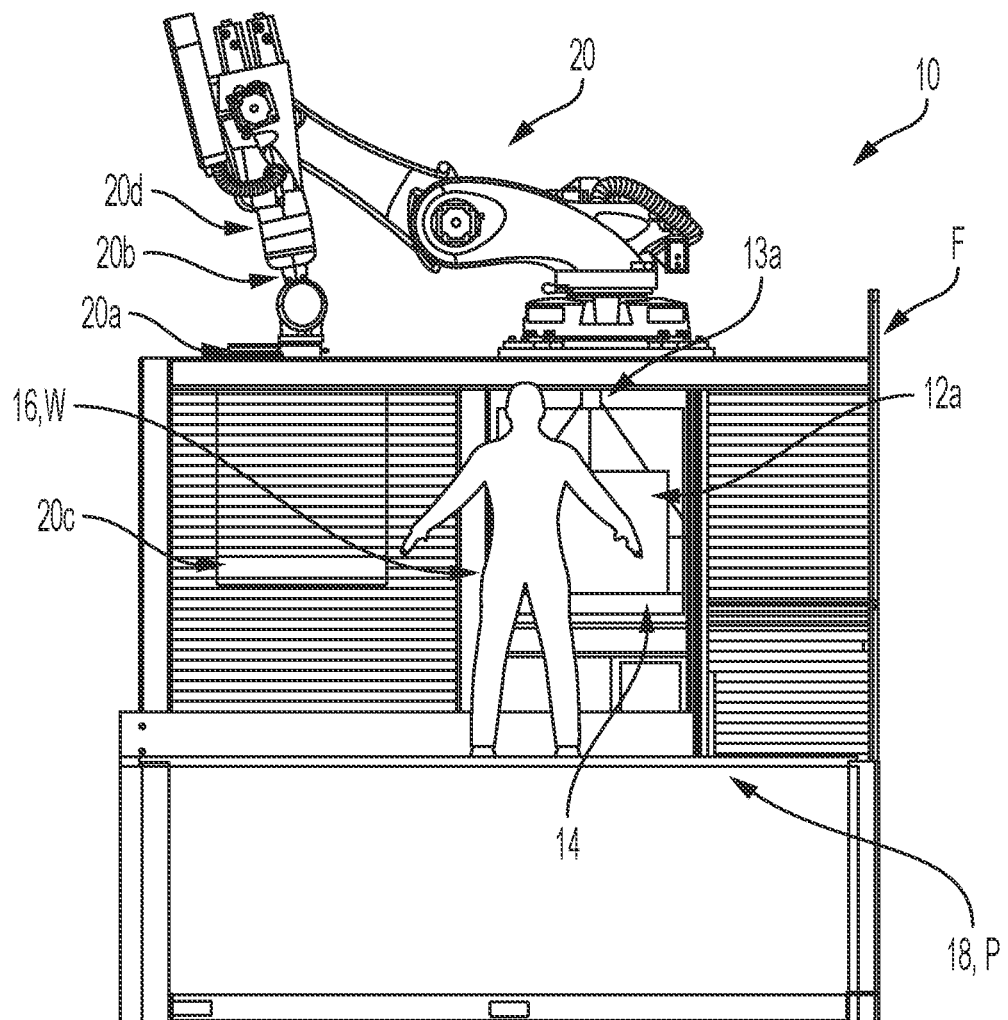
FIG. 4 is a rear elevational view thereof.
Figure 5:
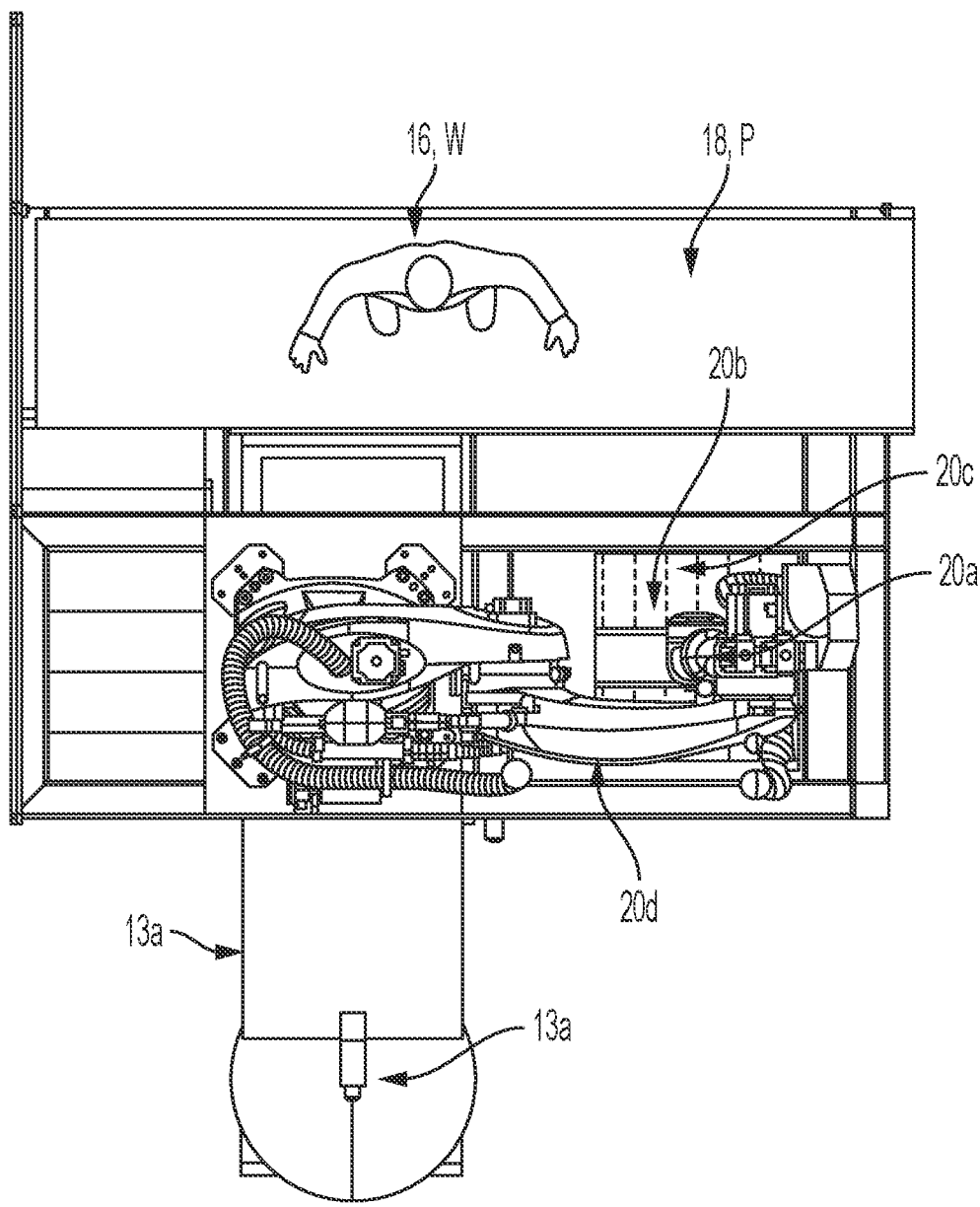
FIG. 5 is a top plan view thereof.
Figure 6:
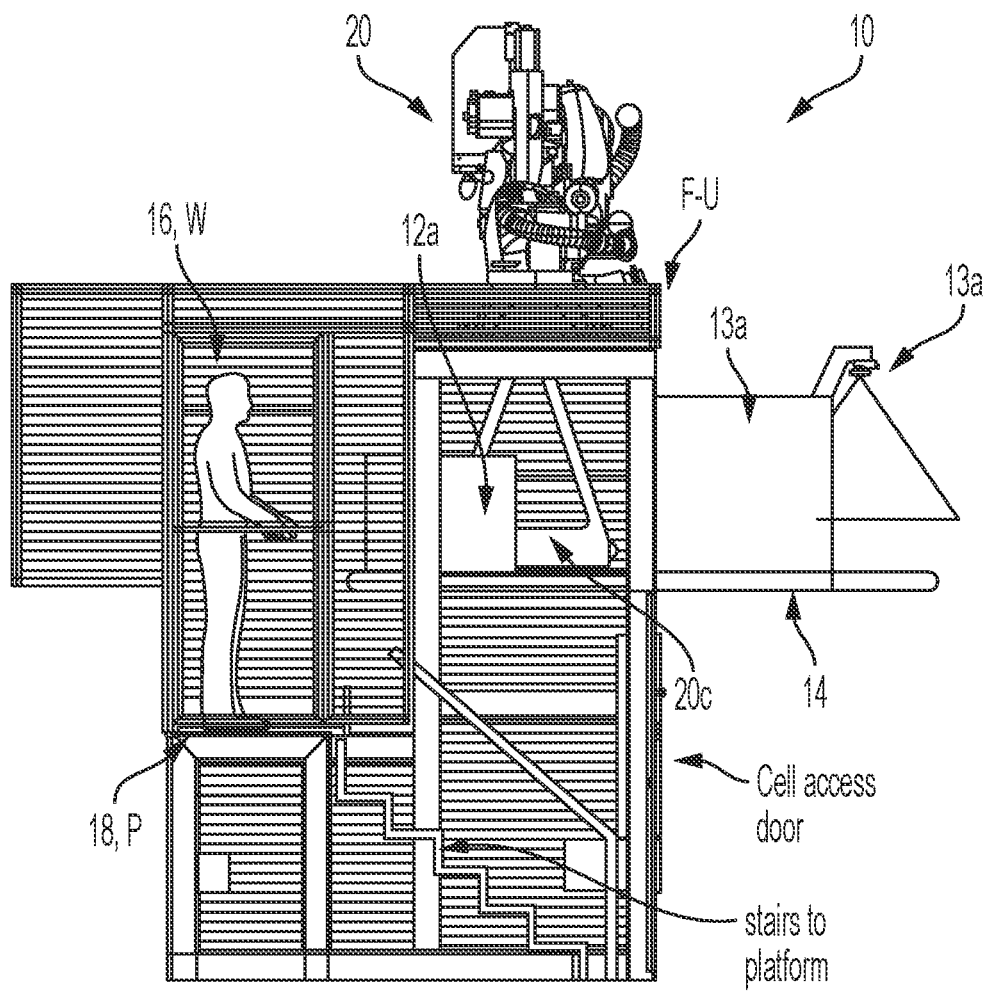
FIG. 6 is a side elevational view opposite the view of FIG. 3.
Figure 7:
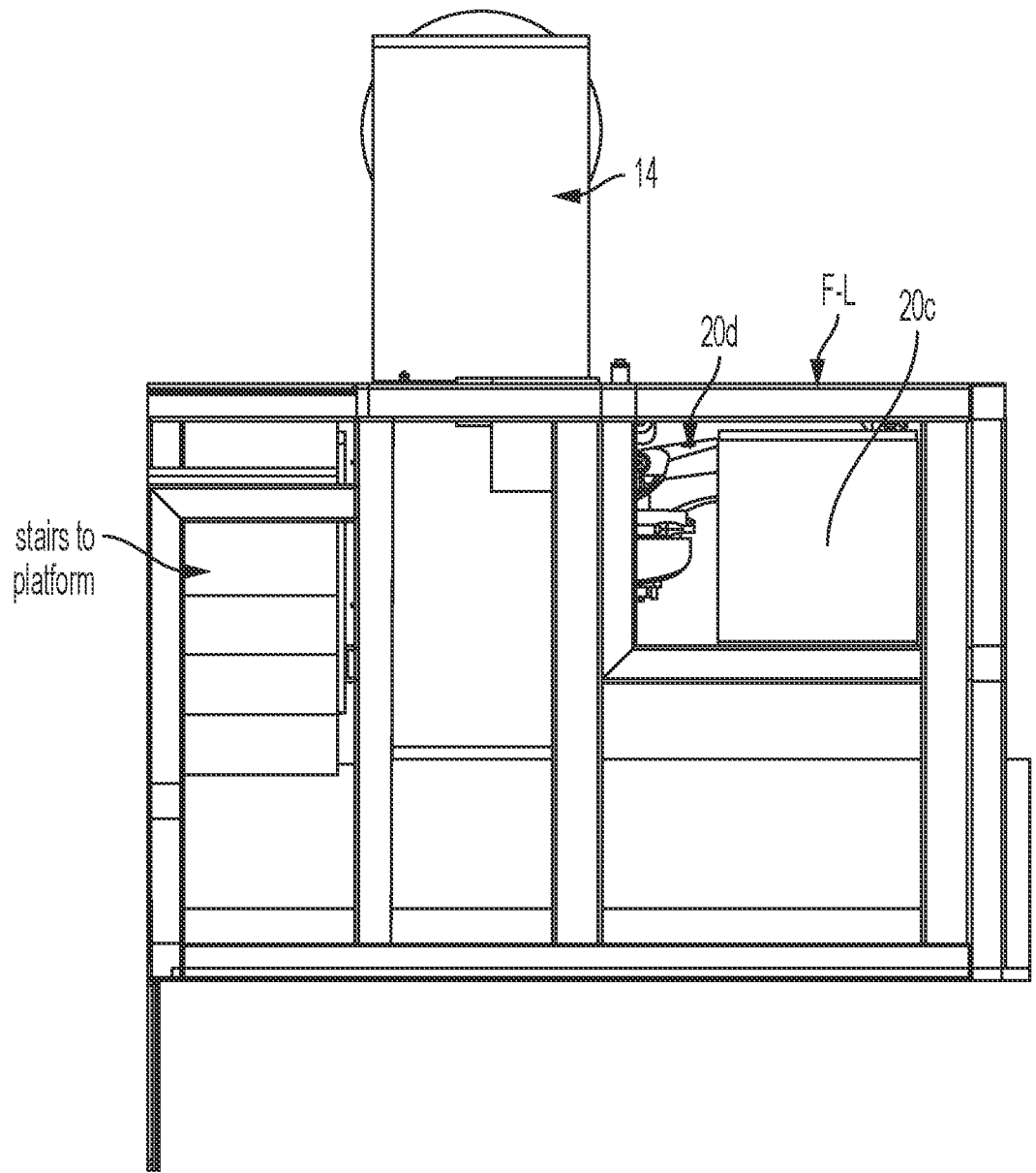
FIG. 7 is a bottom plan view thereof.

Referring to FIG. 1A, the robot associated with at least one of the plurality of package sort cells includes a robot arm and an end of arm tool 20a, the end of arm tool may comprise a carriage having a frame 7 and an end of frame conveyor 9, the frame 7 extending between and forming a space "S" between the robot end of arm 20b and the end of frame conveyor 9, the robot end of arm being movable to a position suspending the carriage therefrom, the end of frame conveyor 9 having opposite front and back ends 9a, 9b and an upper package transport surface 9c selectively movable back and forth between the end of frame conveyor front and back ends 9a and 9b, respectively.

Multiple unsorted packages such as packages 12a and 12b arrive to the cell 10 from a package delivery point PD. The packages are loaded onto an in-feed conveyor 14 where they are interrogated for routing information. For example, the package 12a may include a routing code 12a' which is read by a code reader 13a which may be mounted to the frame F, robot 20, robot EOAT 20a, or a panel or shroud 13b, for example.

Again, the robot 20 may be located within a frame F. The frame F may include one or more of a frame lower member F-L, one or more frame vertical members F-V and one or more upper frame members F-U.

Figure 30:
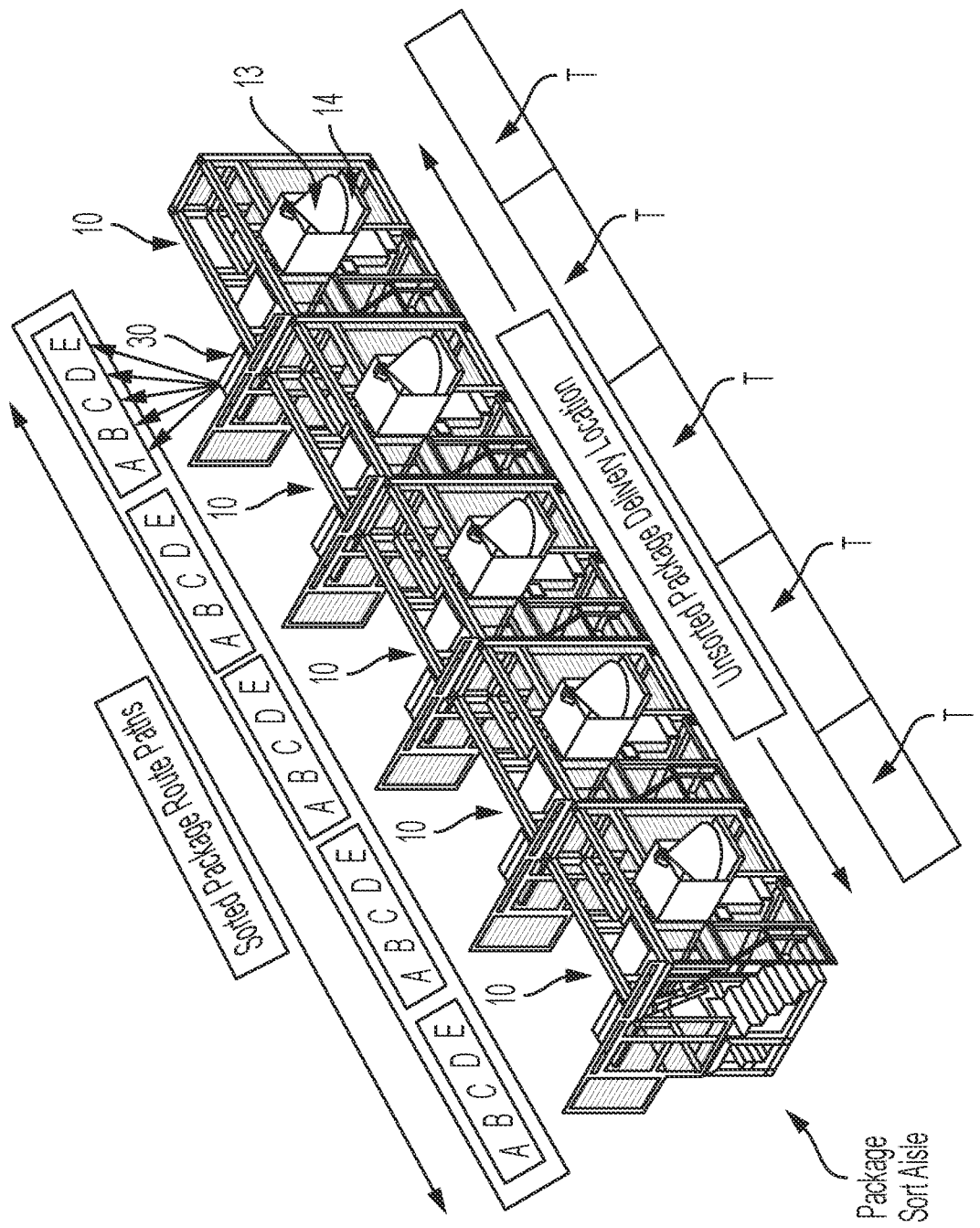
FIG. 30 is a perspective view of one embodiment of a package sort system showing a plurality package sort cells.

As seen in FIG. 30, in one possible environment of a package sort facility, one or more package sort cells 10 may be placed along a package sort aisle extending between one or more respective unsorted package delivery locations and a plurality of package route paths R1-R4, for example.

Figure 31:
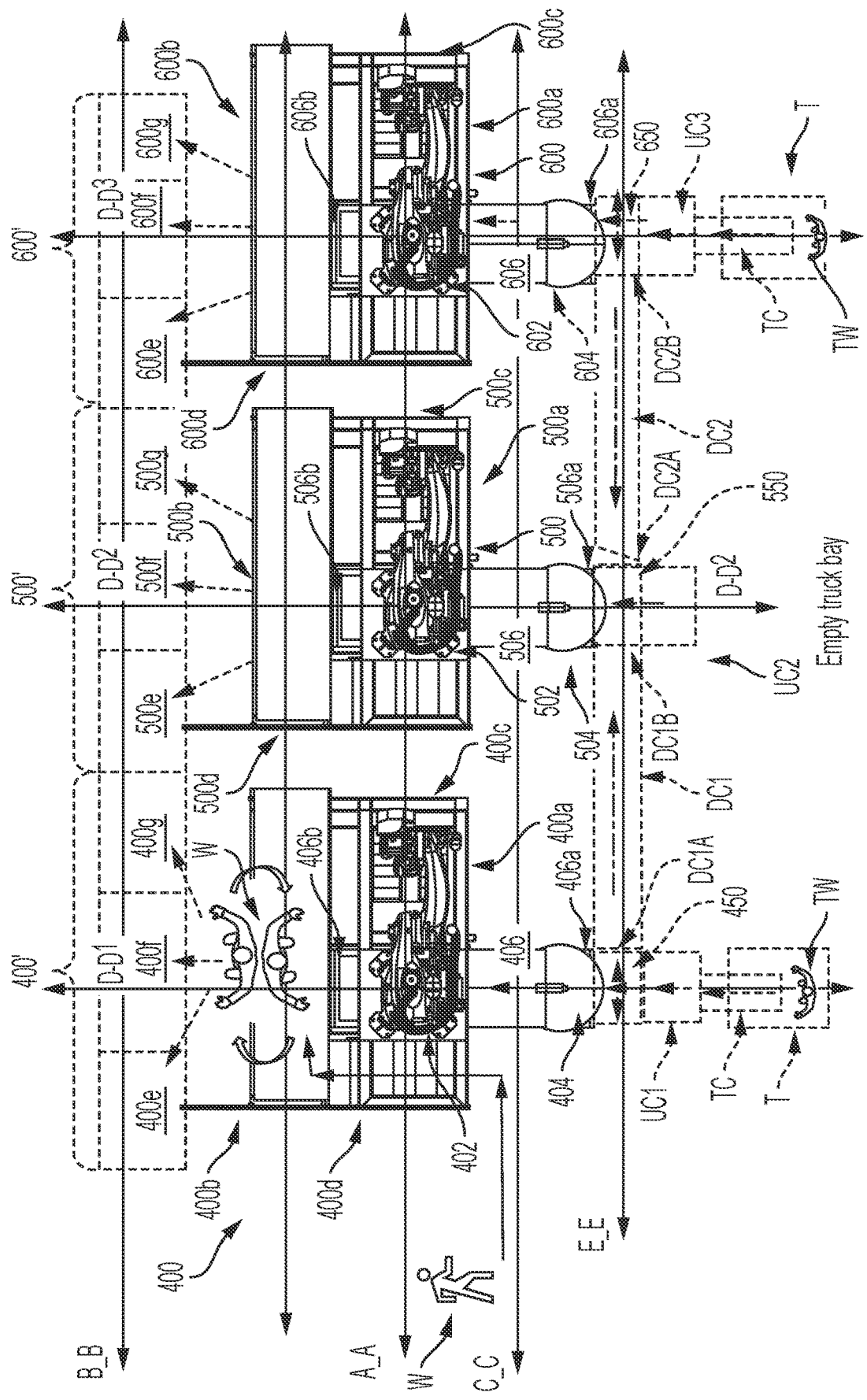
FIG. 31 is a top plan view of yet another embodiment of a package sort system showing a plurality of package sort cells.
Figure 32A:
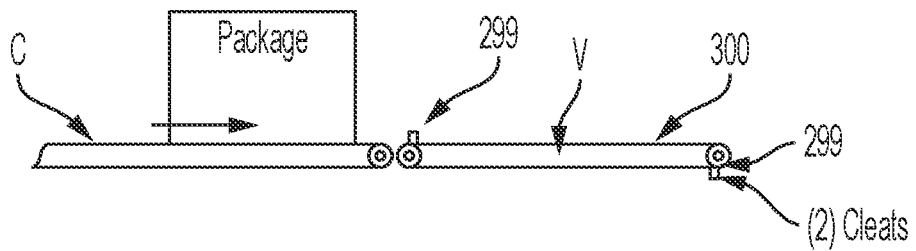
FIGS. 32A-32C show simplified schematic views of a package anti-tip conveyor.
Figure 32B:
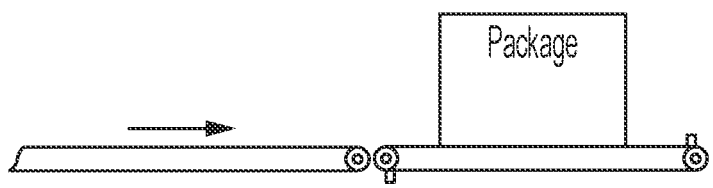
Figure 32C:
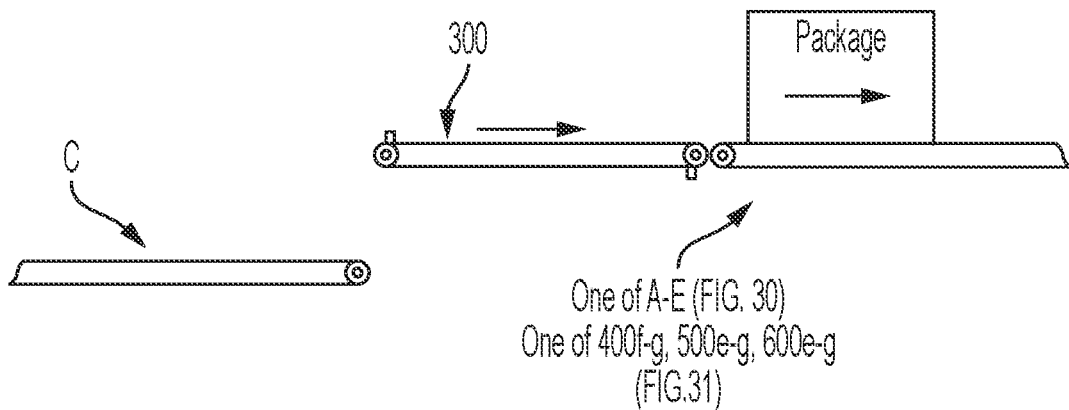

FIG. 31 shows another embodiment of a package sort system discussed in detail below.

Figure 33A:
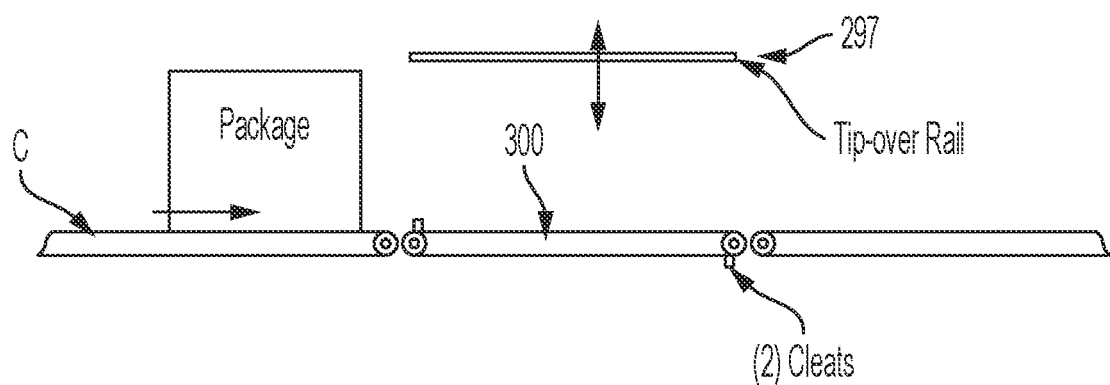
FIGS. 33A-33B show simplified schematic views of another embodiment of package anti-tip conveyor.
Figure 33B:
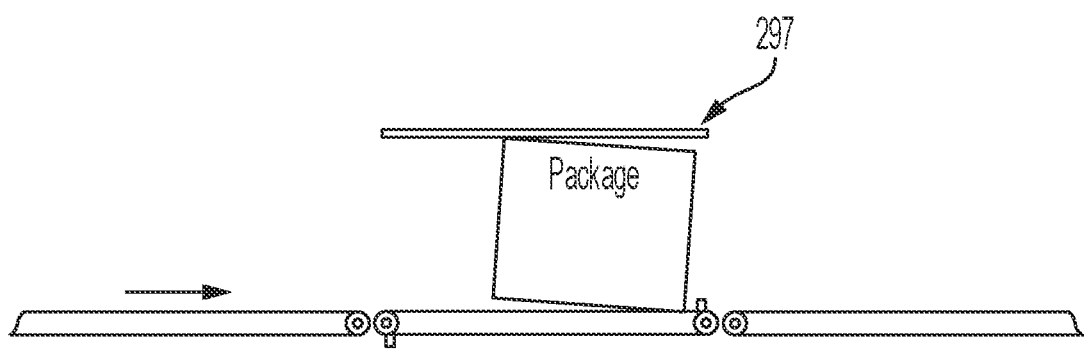
Figure 34A:
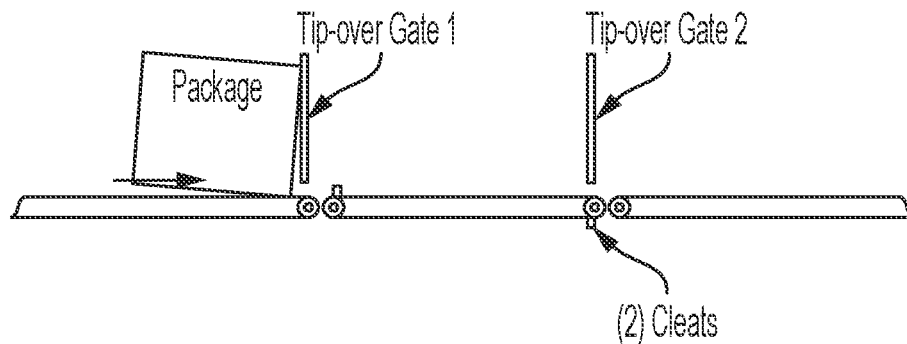
FIGS. 34A-34F are simplified side elevational views of package anti-tip mechanisms as a package conveys from the in-feed conveyor to the EOAT conveyor and to the out-feed conveyor.
Figure 34B:
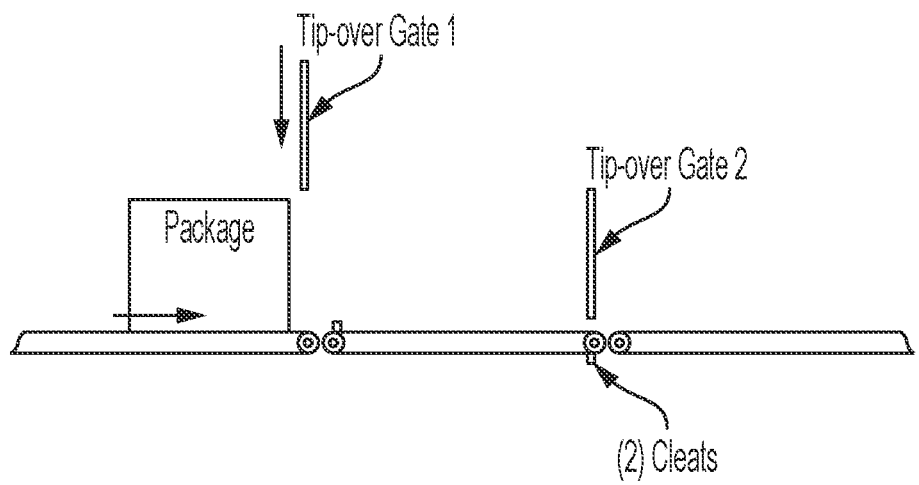
Figure 34C:
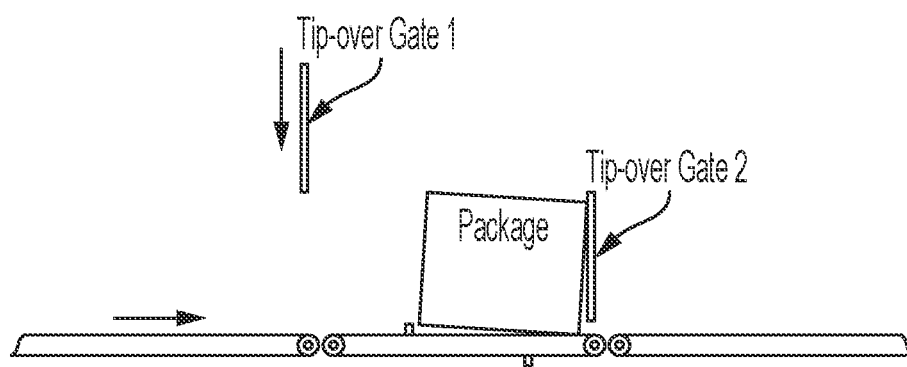
Figure 34D:
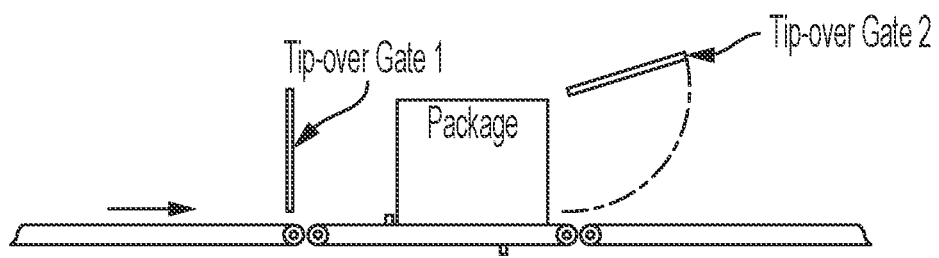
Figure 34E:
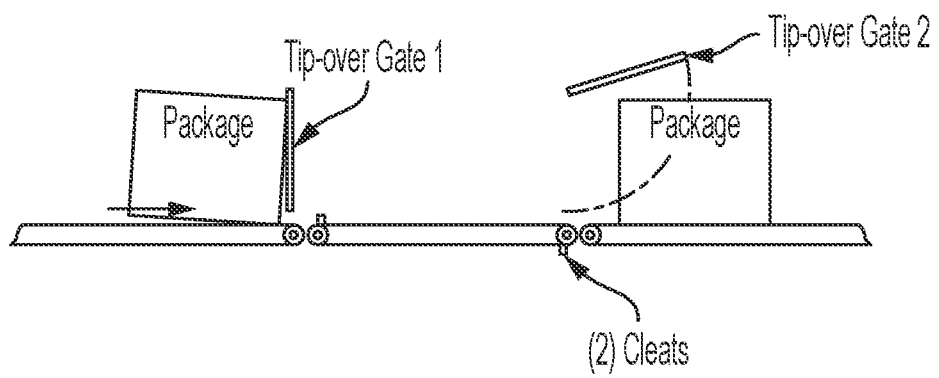
Figure 34F:
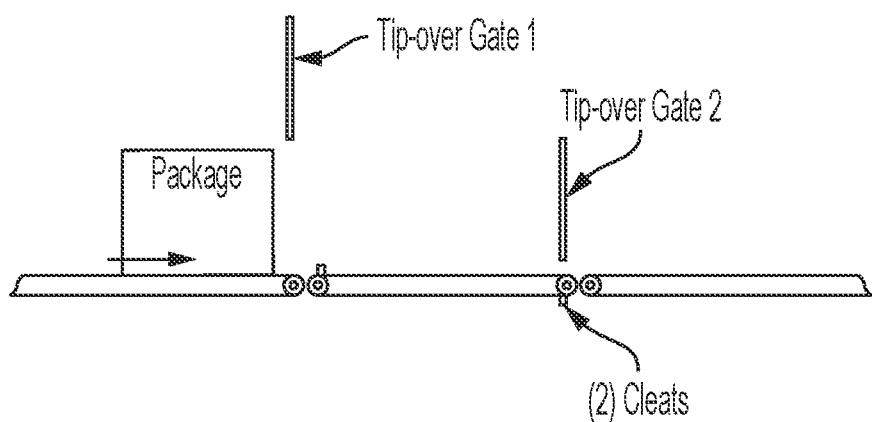

The robot 20 may be fitted with an end of arm tool (EOAT) 20a operable to pick and place a package from the unsorted package delivery location to the appropriate sorted route path R1-R4 (or A-E as seen in FIG. 30; or 400e-g, 500e-g, 600e-g in FIG. 31). The end of arm tool may be of any desired type. In one embodiment, the end of arm tool is a package platform 20c. The platform may be a uni-directional or bi-directional conveyor which may include vacuum assist to maintain the package on the platform/conveyor during the pick and place package transfer process. Other methods for preventing unintended package movement while on the conveyor may be used alone or in combination such as a cleated conveyor surface which may be combined together with vacuum assist, examples of which may be seen in FIGS. 32a-c, 33 a-b and where one or more cleats 299 are provided on conveyor 300. An optional vacuum V may be provided in the interior space of the conveyor where holes 35 (see FIG. 35f) in the conveyor belt act to pull the package to the conveyor surface. The vacuum may be electronically controlled to release when conveyor 300 hand off the package to the out feed conveyor. In the embodiment seen in FIG. 33, tip over rails 297 may be provided for package stability on the end of arm conveyor. In this example, a bar or plate is spaced above the conveyor 300 creating a stop against which the package on the conveyor will hit should the package begin to tilt.

FIGS. 35a-h show an embodiment of sort cell including first and second anti-tip gates 700, 702, respectively, which may be of any suitable configuration such as in the form of movable plates mounted adjacent the second out-feed end 14b of the in-feed sort cell conveyor 14 and adjacent the rear end 20c' of the EOAT conveyor 20c, respectively. As such, a package 12a being transported on the in-feed sort cell conveyor 14 will encounter the first gate 700 thus preventing the package from tipping over should the speed of the conveyor 14 cause a tipping motion of the package 12a once thee conveyor 14 stops in anticipating of moving the package onto the EOAT conveyor 20c.

Once the EOAT conveyor 20c is positioned adjacent and flush to the second out-feed end 14b of the in-feed conveyor 14, gate 700 is moved out of the way so that the package 12a can be moved onto the EOAT conveyor 20c. In the embodiment, the gate 700 is slidingly mounted onto a frame 704 where gate 700 may move back and forth along the frame between an in-use (package anti-tipping) and out-of-use (out of the way) position. This gate movement may be controlled by appropriate electronic controls and software that initiates the appropriate movement of first gate 700 in response to conveyor 14 and/or EOAT 20a movement. Particularly, the software may be programmed to cause the gate 700 to move into the package anti-tipping position upon receiving a signal that the in-feed conveyor 14 received a package 12a onto the conveyor 14 and the conveyor 14 has come to a stop and/or a sensor senses a package 12a approaching the second (out-feed end) 14b of the conveyor. The software may further be programmed to move gate 700 to the out-of-use position upon receiving a signal that the EOAT 20a is in position adjacent the second end 14b of the conveyor 14 and ready to receive the package.

The second gate 702 may be slidingly or, as shown in the FIGS. 35a-h, pivotally mounted onto a frame 706 where gate 702 may pivot between an in-use (package anti-tipping) and out-of-use (out of the way) position. This movement may be controlled in any desired manner, for example via use of a linear actuator 708 by appropriate electronic controls and software that initiates the appropriate movement in response to conveyor 14 and/or EOAT 20a movement. Particularly, the software may be programmed to cause the gate 702 to move into the anti-tipping position upon receiving a signal that the EOAT 20a is in position to receive a package 12a onto its conveyor 20c. The software may further be programmed to move gate 702 to the out-of-use position upon receiving a signal that the EOAT conveyor 20c has stopped with the package 12a thereon.

Figure 29:
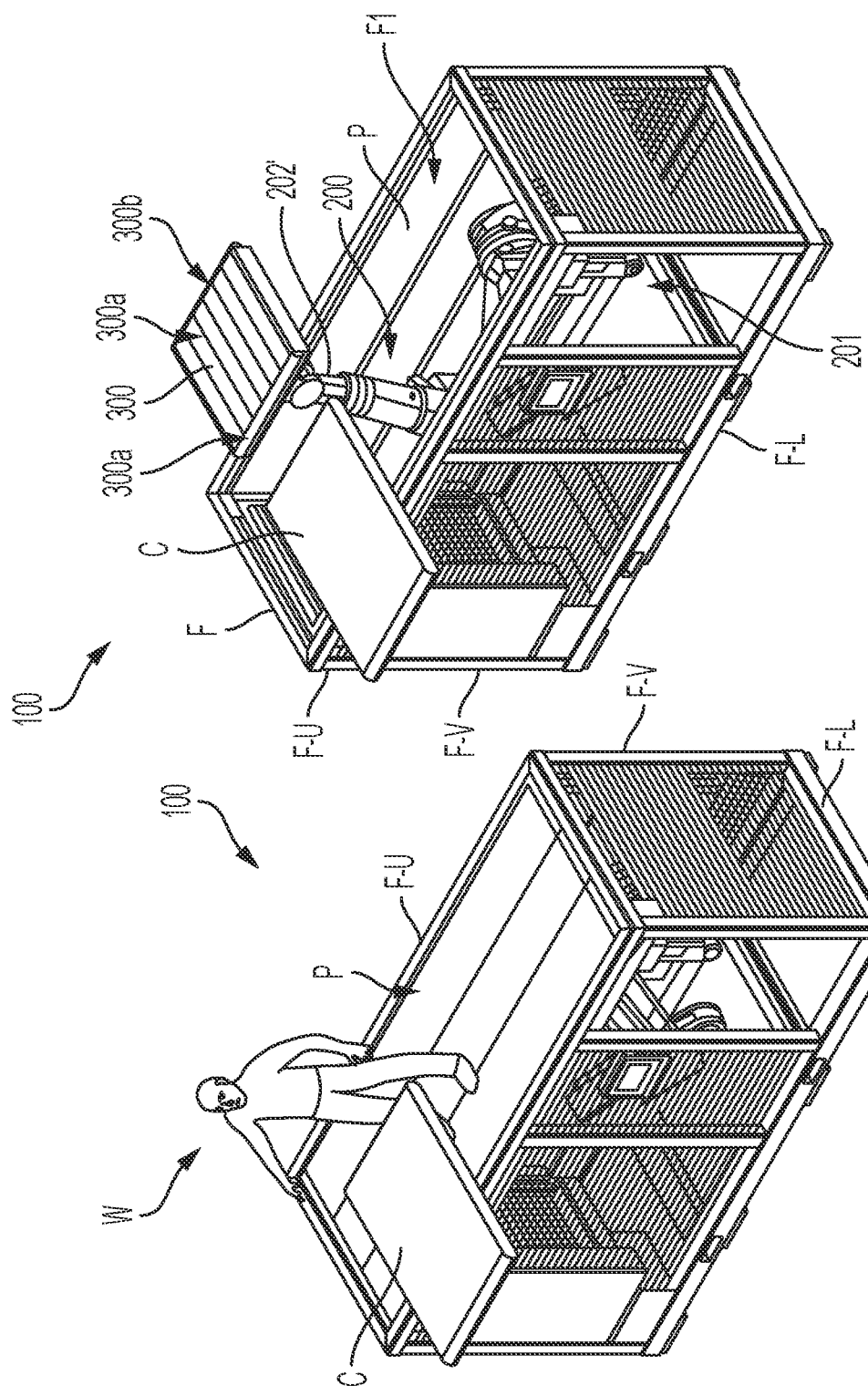
FIGS. 29A-29B show perspective views of an embodiment of a sort cell in each of the worker and robot in-use configurations.

Referring again to FIG. 1, the cell 10 may include a platform 18 (or "P") adjacent the frame F on which a worker 16 (labeled W in FIG. 31) may stand to perform the package pick and place function when necessary (e.g., when the robot is down). The platform 18 may be movable between an in-use position and a stored position. In one particular embodiment such as seen in FIG. 29B, a robot 200 is mounted in a location such that the multi axis arm 202 may extend through a top opening F1 in the frame F as the robot end of arm tool 300 picks (accepts on its upper surface 300a) and places a package from the delivery location to the correct route path (see also FIG. 8). Should the robot 200 have downtime, the robot may be put into a storage position as seen in FIG. 29A close to its base 201 and the worker platform P may be moved to an in-use position seen in FIG. 29A. The in-use position of the platform P may extend over the previously open area F1 of the frame F where the robot end of arm tool extended when operating (FIG. 29B). As such, a worker W may take over and perform the package pick and place operation while the robot 200 is in downtime by standing on the platform P.

In one embodiment, detection of robot malfunction may initiate a software program routine operating in conjunction with the package sort cell where the program instructs the robot 200 to collapse to the storage position and the platform P to move to the in-use position seen in FIG. 29A. The program may include functionality alerting a worker W (e.g., via a smart phone app) that a robot malfunction has been detected. A graphic user interface (GUI) (see FIGS. 2 and 8) may be located on or adjacent the cell for manual worker control of the cell as needed (e.g., when the robot is not responding to the "move to storage position" instruction and/or the platform is not responding to the "move to in-use position" instruction).

In the above embodiment, the robot 200 may be mounted to or adjacent a lower segment of the frame F-L where the robot end of arm 202' is primarily located below the conveyor and package (FIGS. 29A and 29B). In the embodiment of FIGS. 1-7, the robot 200 may be mounted to an upper frame member F-U where the robot end of arm is located primarily above the sort cell conveyor 14 (the sort cell conveyor is labeled C in FIGS. 29A and 29B). In another embodiment seen in FIGS. 8-14 and 29a,29b, the robot is mounted to or adjacent the lower frame member F-L which may be the floor of the package sorting facility. In yet another embodiment, the robot may be mounted between the upper and lower extents of the frame (e.g., on or adjacent a vertical frame member F-V).

A package address route reader 13a with or without a covering or shroud 13b (see also FIG. 1) may be mounted to or adjacent the frame F in a location between the unsorted package delivery location and the package pick location. In another embodiment, the route reader may be mounted to the robot adjacent the end of arm tool where the route is read as the robot picks the package.

Referring again to FIG. 30, the package sort cell 10 may be modular in the respect that two or more package sort cells 10 may be placed in side-by-side relation along an aisle extending between an unsorted package delivery location and a plurality of route paths. For example, an unsorted package delivery location may be associated with a respective package sort cell. Each sort cell 10 is associated with two or more route paths such as A-E so that the package may be placed at the correct route path in accordance with the interrogated route information on the package.

The sort cells 10 (applies also to cells 400, 500, 600 in FIG. 31) may be connected to an appropriate power source necessary for the functionality of the electronic components associated with each cell (e.g., robot, route reader, computer controls, etc.). In a particularly advantageous embodiment, the cells are equipped with built-in electrical connections that allow quick connection to the power source. As such, a main electrical source may power all cells such that each cell need not have its own dedicated power source. For example, an elongated electrical conduit may extend along the sort cell aisle and each cell may "plug into" the conduit. Individual sort cells may thus be quickly added, replaced or removed from the sort aisle as needed.

For the sake of description, one exemplary package sorting environment is illustrated in FIG. 30 where truck trailers represented by "T" containing unsorted packages of varying shapes, sizes and weights are backed up to a respective package sort cell 10. A worker in the truck trailer loads the packages located in the trailer onto a conveyor which moves the packages out of the trailer to the respective sort cell 10. In a large package routing facility, many tractor trailers are constantly arriving and leaving the facility to drop off packaging for sorting and/or pick up sorted packages for delivering to their next transit location (e.g., the package final destination or anther package sorting location). The trailers may be arranged in side-by-side relation adjacent a respective package sort cell located in the sort aisle. On the other side of the sort aisle is the plurality of route paths associated with each sort cell 10. In one possible embodiment, there are five different route paths A-E associated with each sort cell 10. Each sort cell 10 operates to pick and place each package unloaded from the trailer T to the particular route path which is dictated by the route reader associated with the sort cell.

The robot end of arm tools may include any type of package pick and place tool. A typical pick and place end of arm tool is a gripper (not shown). These types of pick and place tools may not be reliable in an environment where the object (e.g., package) to be picked may be of a varying size, shape and weight. In the embodiment seen in FIGS. 1-7, the tool is a carriage type tool where a platform is suspended from a frame suspended from the robot end of arm. The platform may be vacuum assisted to help maintain the package on the platform during transport between pick and place. The platform may be unidirectional or bidirectional conveyor to assist in pick and place. The robot may be programmed to align the platform with the conveyor delivering the package to the package reader (see FIG. 13, for example).

Yet another embodiment of a package sorting system is in seen in FIG. 31 which includes cell to cell unsorted package diversion to improve efficiencies when one truck bay is empty but the adjacent truck bays on either or both sides thereof are not empty (i.e., the adjacent cell on either or both sides of the empty truck bay cell has a truck offloading packaged to be sorted). In FIG. 31, the package sorting system comprises a plurality of package sort cells 400, 500 and 600. The package sort cells may be identical to each other or have different sort cell configurations as have been described herein depending on the need. Furthermore, while three sort cells are illustrated in FIG. 31, it is understood that any number of sort cells may be used in the sort cell system, as desired.

Sort cells 400, 500, 600 each have a respective robot operable 402, 502, 602, respectively, operable to move packages from one location to another in response to instruction received from an electronic package identifier unit 404, 504, 604 associated with a respective package sort cell 400, 500, 600. Package sort cells 400, 500, 600 may be arranged in linearly spaced relation along a first axis A-A defining a sorting aisle, each sort cell having opposite front and back sides 400a, 400b; 500a, 500b; and 600a, 600b, respectively, and opposite right and left sides 400c, 400d; 500c, 500d; and 600c, 600d, respectively.

A plurality of sorted package hand-off receiver groups 400', 500' and 600', each having a plurality of sorted package receivers 400e, 400f, 400g; 500e, 500f, 500g; and 600e, 600f, 600g, respectively, are associated with the plurality of sort cells 400, 500 and 600, respectively. The plurality of sorted package hand off receiver groups and sorted package receivers may be arranged in linearly spaced relation along a second axis B-B extending in spaced, parallel relation to first axis A-A and located adjacent the back sides 400b, 500b,600b of the sort cells 400, 500, 600, respectively. It is noted that while the package receiver groups are arranged in linearly spaced relation, the individual sorted package receivers of each group may be arranged in any desired configuration, e.g., vertically stacked, one on top of the other, rather than the horizontal side-by-side configuration shown in FIG. 31. The sorted package receivers may be any desired type of package hand-off such as, for example, a conveyor or bin, from which the sorted package is delivered to its intended route as read by the respective package identifier unit.

The sort cell system of FIG. 31 further includes a plurality of sort cell conveyors 406, 506, 606 arranged in linearly spaced relation along a third axis C-C extending in spaced, parallel relation to said first and second axes A-A and B-B, respectively, and adjacent the front side 400a, 500a and 600a of each said sort cell 400, 500 and 600, respectively.

Each said sort cell conveyor 406, 506 and 606 includes opposite first and second conveyor ends 406a, 406b; 506a, 506b; and 606a, 606b, respectively, extending along a fourth axis D-D$^1$, D-D$^2$ and D-D$^3$ which pass through a respective sort cell 400, 500, 600 and respective sorted package hand-off receiver groups 400', 500', 600', the fourth axis D-D$^1$, D-D$^2$ and D-D$^3$ of each sort cell 400, 500 and 600 extending in spaced, parallel relation to each other and in perpendicular relation to the first, second and third axes A-A, B-B and C-C.

Each sort cell conveyor 406, 506 and 606 is operable to convey a package to be sorted from the conveyor first end 406a, 506a, 606a to a position adjacent the conveyor second end 406b, 506b and 606b, which are located adjacent the back side 400b, 500b, 600b of a respective package sort cell 400, 500 and 600.

Each robot 402, 502 and 602 is operable to move packages one at a time from a respective sort cell conveyor second end 406b, 506b, 606b to a selected one of the respective package hand-off receivers 400e-g, 500e-g, 600e-g according to the instruction received from the respective package identifier unit 404, 504, 604.

Each package sort cell 400, 500 and 600 and associated sorted package hand-off receiver groups 400', 500' and 600' and associated sort cell conveyors 406, 506 and 606 together form a single package sort cell with each package sort cell lying along its respective fourth axis D-D$^1$, D-D$^2$ and D-D$^3$.

Referring again to FIGS. 29A and 29B with reference also to FIG. 31, the robot associated with at least one of the package sort cells 400, 500, 600 may include a robot arm 202 and an end of arm conveyor 300 mounted on the robot end of arm 202', the end of arm conveyor having opposite front and back ends 300a, 300b, respectively, with the end of arm conveyor 300 having an upper package transport surface 300' selectively movable back and forth between said end of arm conveyor front and back ends 300a, 300b, respectively, and operable to receive a package from one of the front and back ends of the end of arm conveyor, and operable to hand-off the package from the other of the at least one of the front and back ends of the end of arm conveyor. The upper package transport surface may be one of smooth, cleated and vacuum assisted, or any desired configuration.

Figure 8:
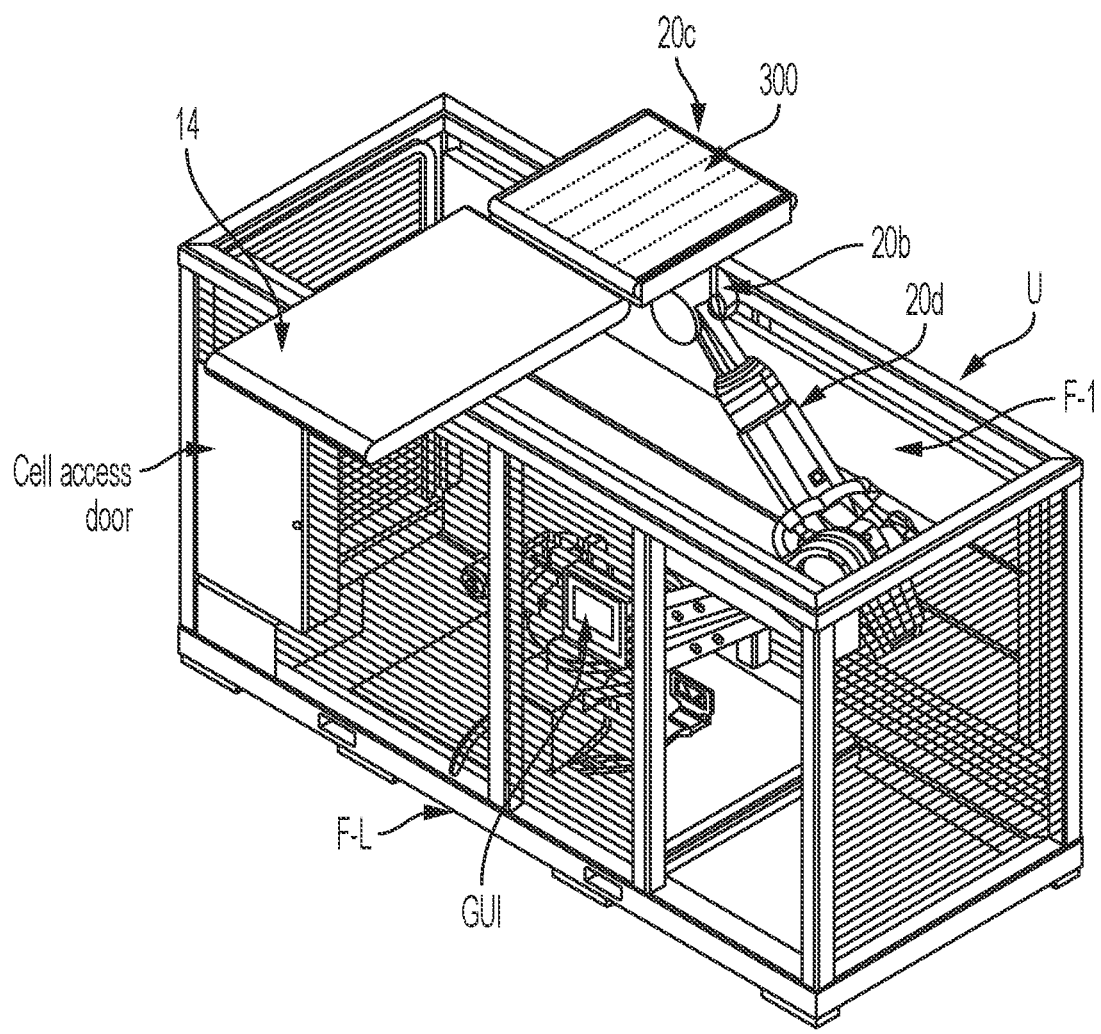
FIG. 8 is a perspective view of another embodiment of the invention.
Figure 9:
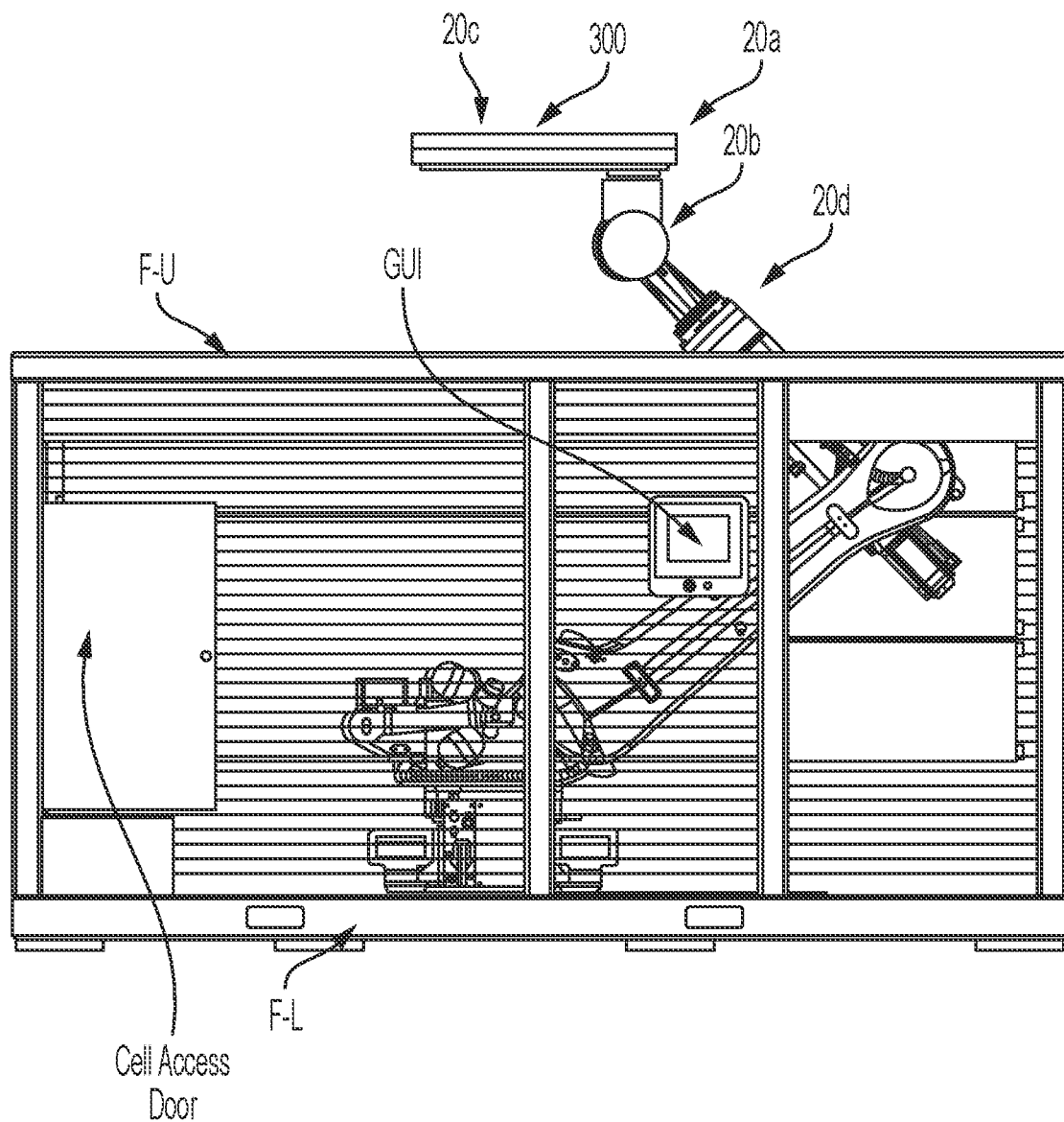
FIG. 9 is a front elevational view thereof.
Figure 10:
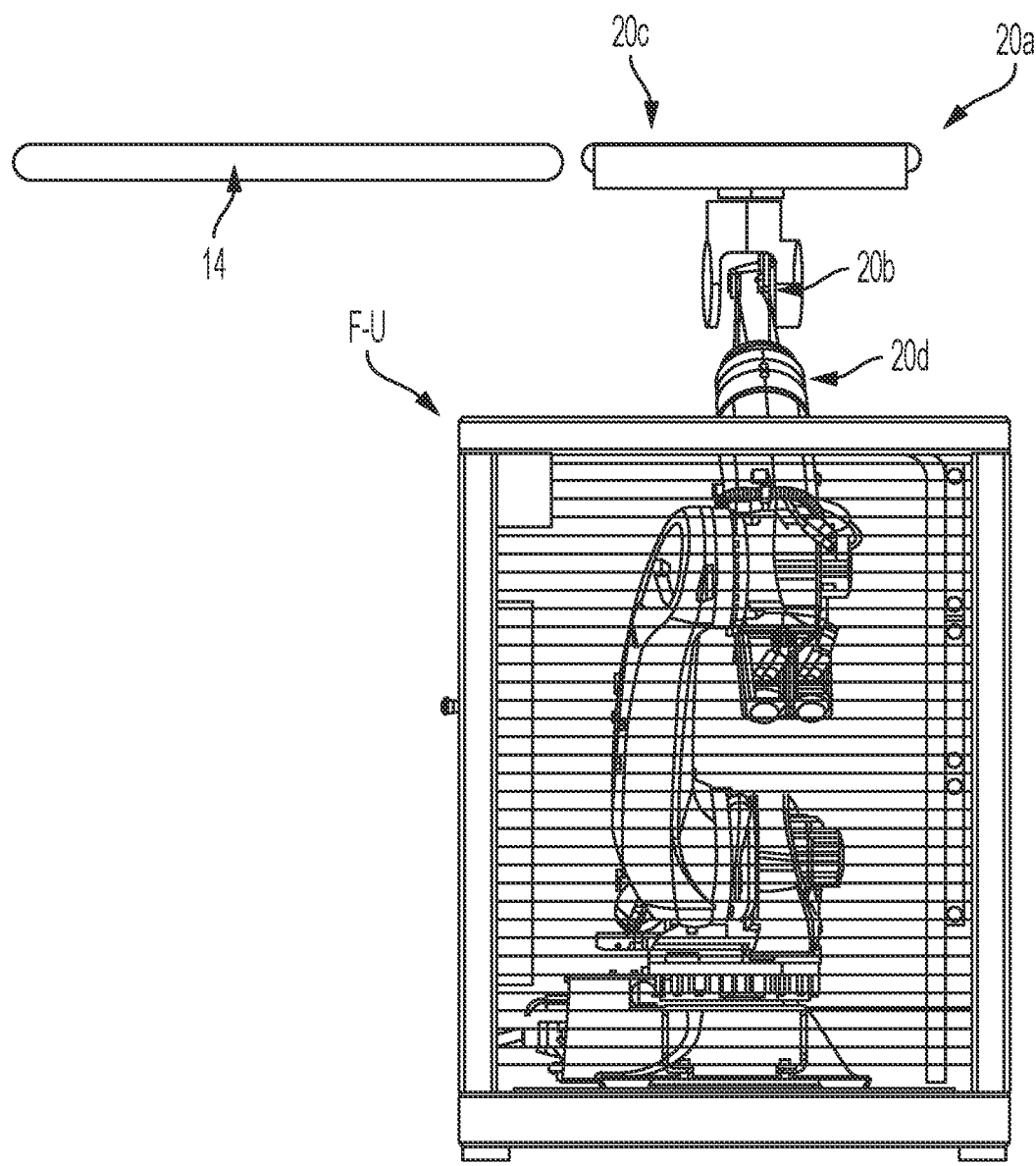
FIG. 10 is a side elevational view thereof.
Figure 11:
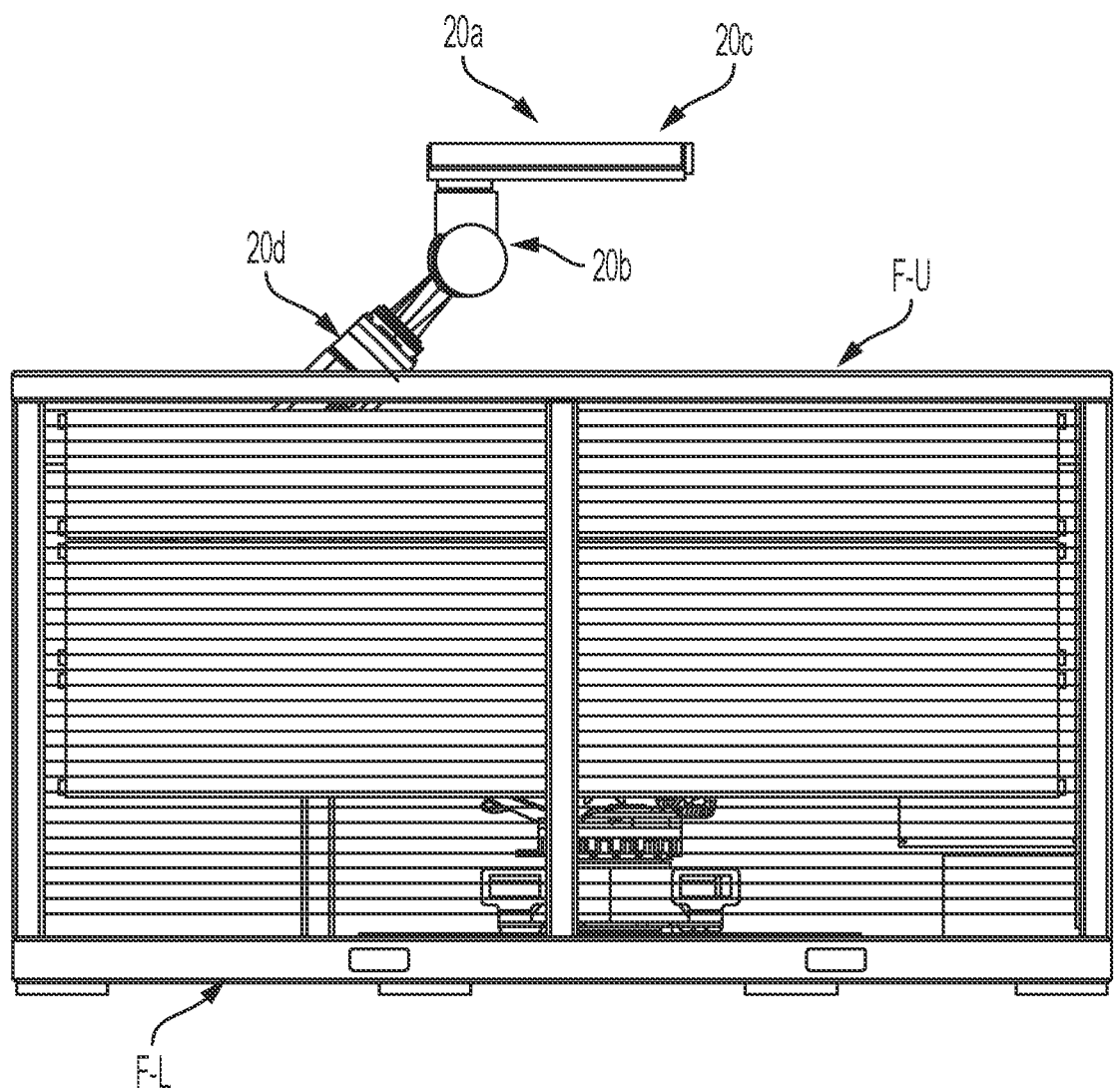
FIG. 11 is a rear elevational view thereof.
Figure 12:
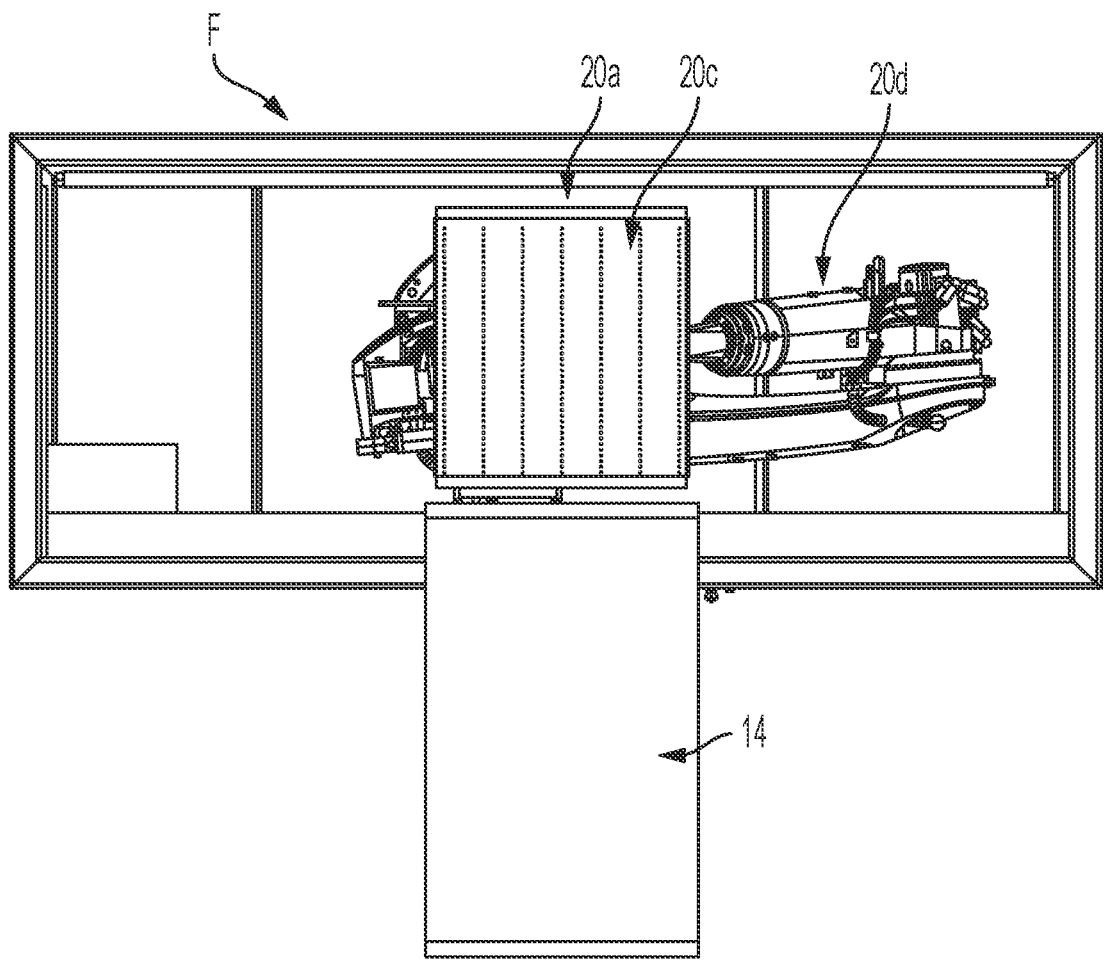
FIG. 12 is a top plan view thereof.
Figure 13:
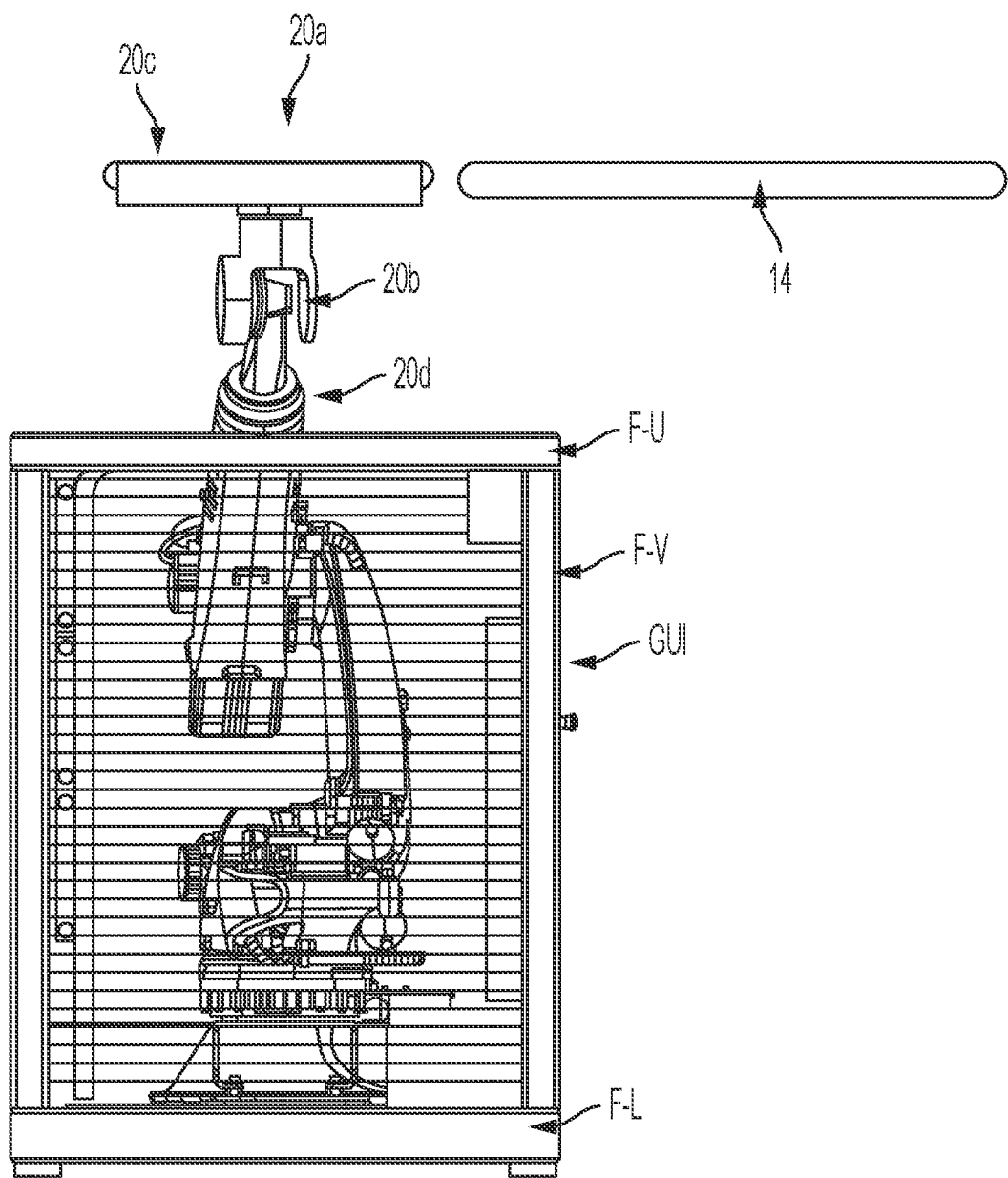
FIG. 13 is a side elevational view opposite the view of FIG. 10.
Figure 14:
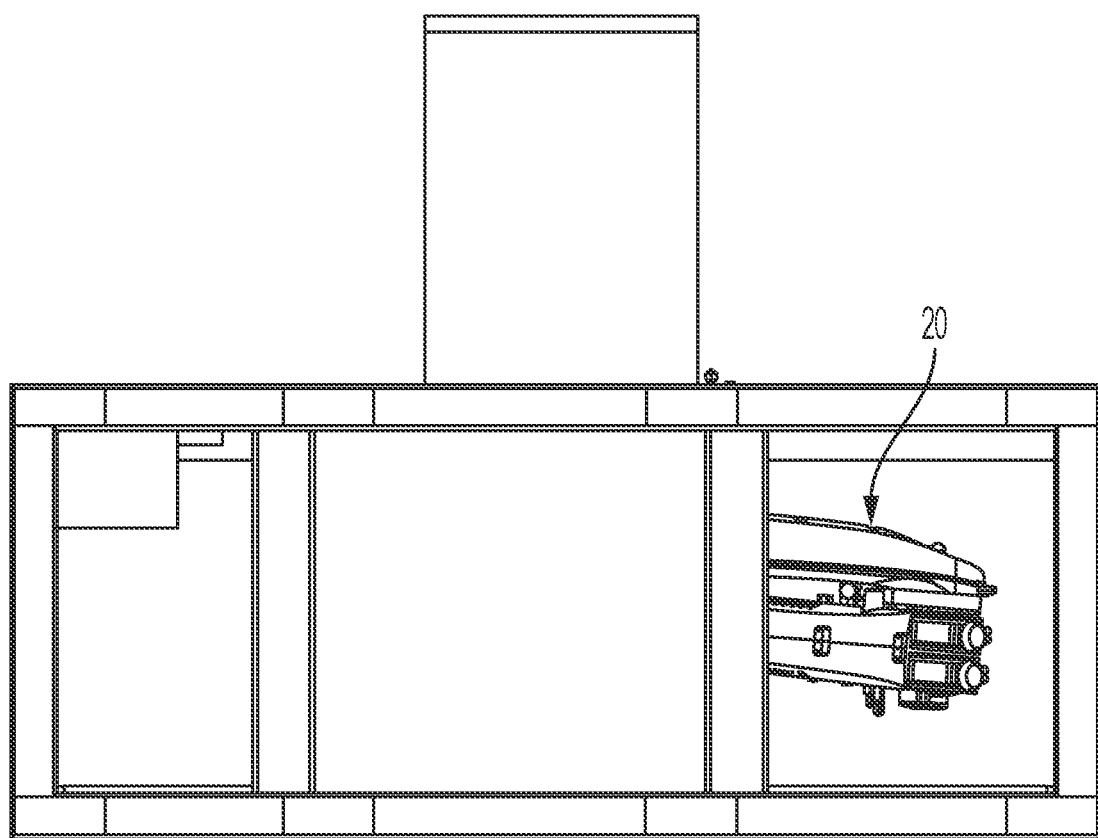
FIG. 14 is a bottom plan view thereof.
Figure 15:
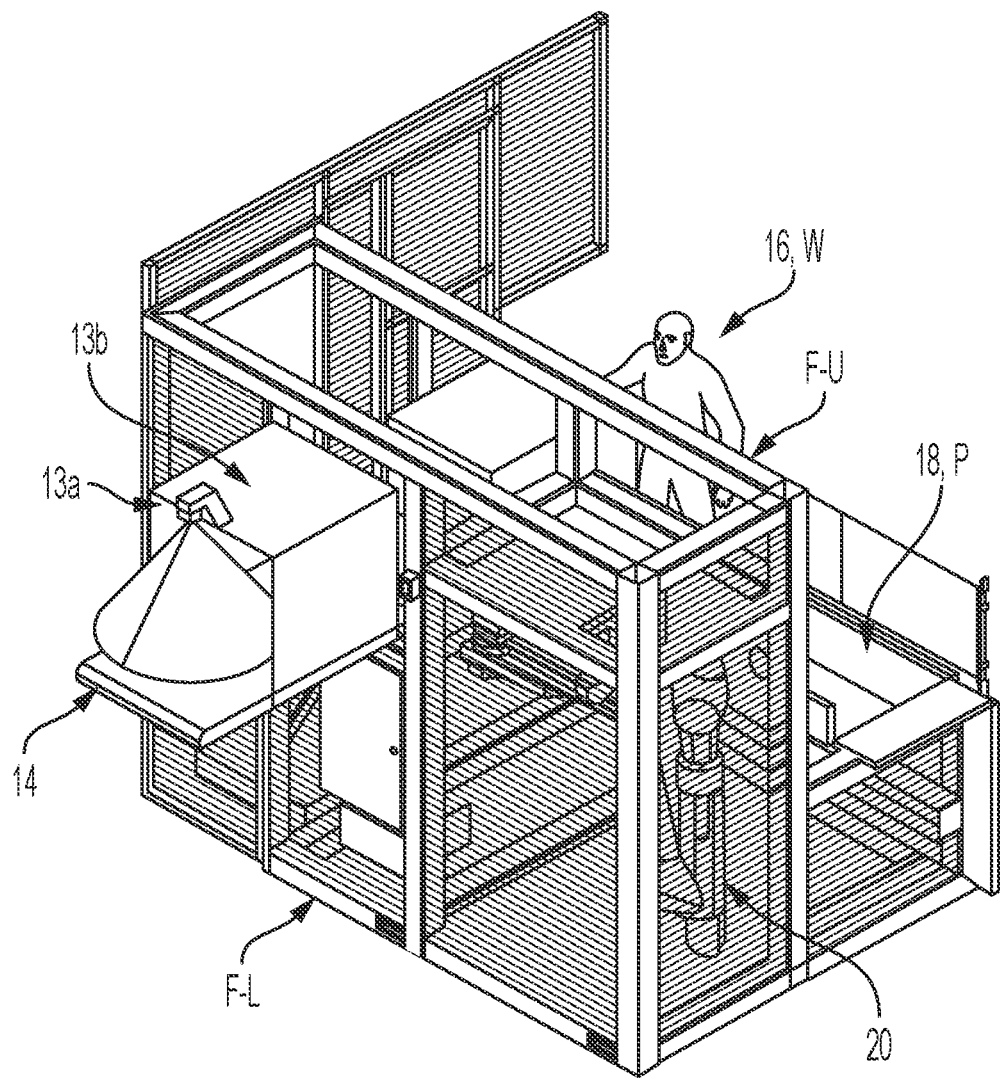
FIG. 15 is a perspective view of another embodiment of the invention.
Figure 16:
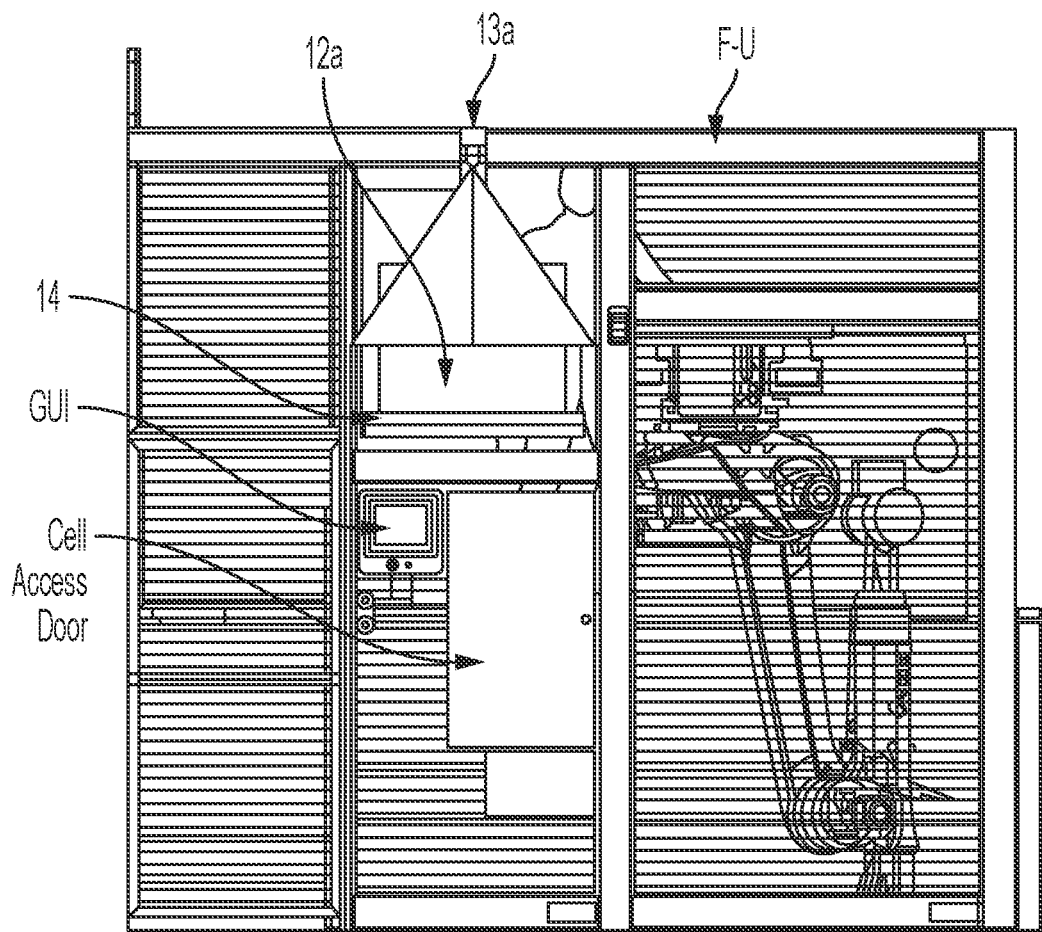
FIG. 16 is a front elevational view thereof.
Figure 17:
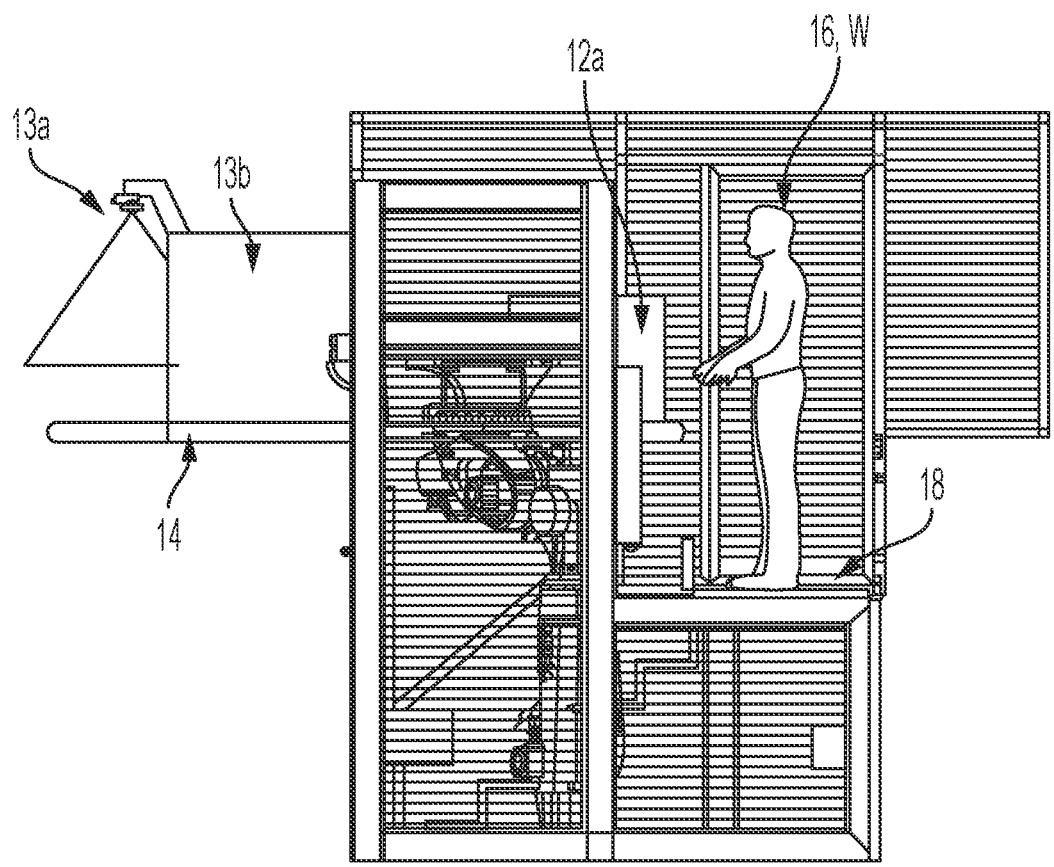
FIG. 17 is a side elevational view thereof.
Figure 18:
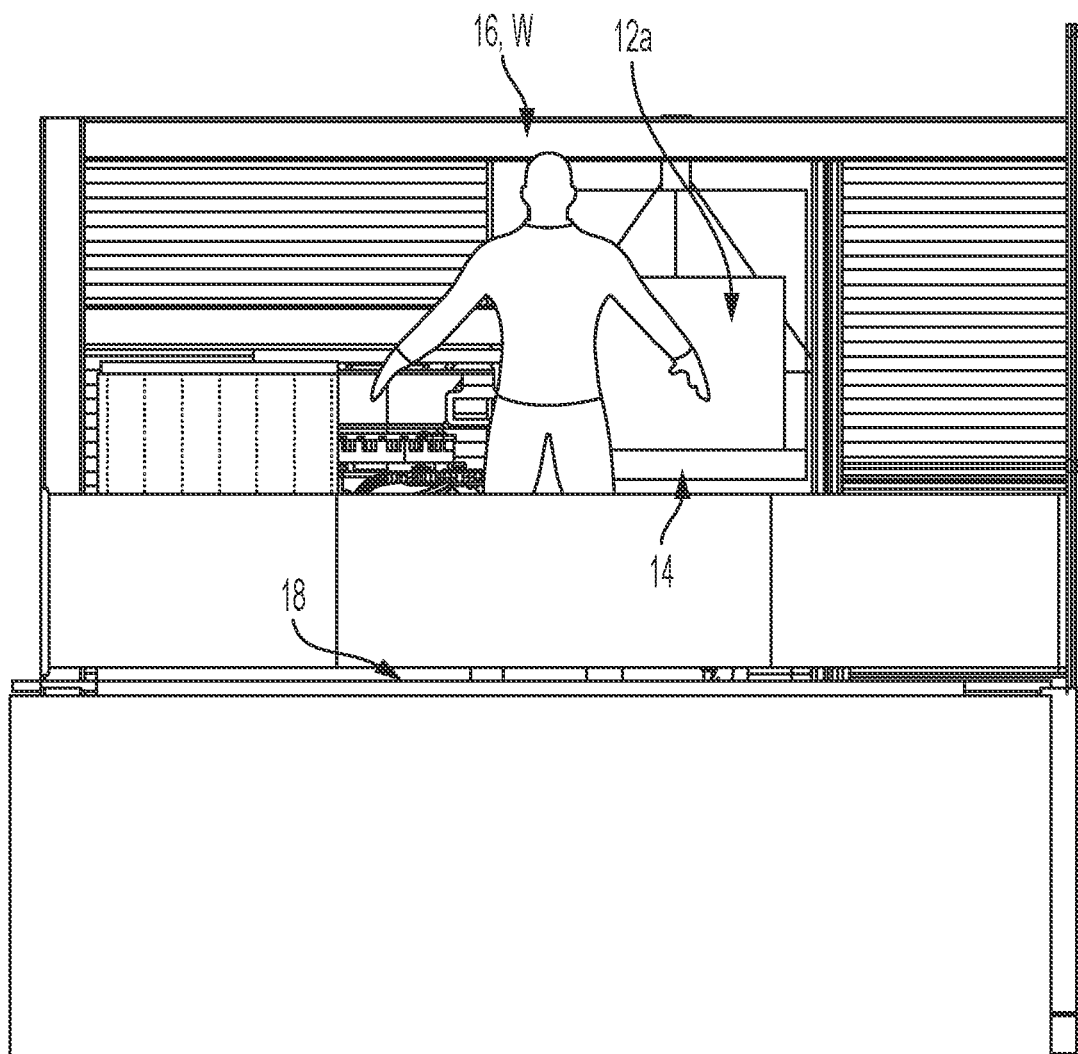
FIG. 18 is a rear elevational view thereof.
Figure 19:
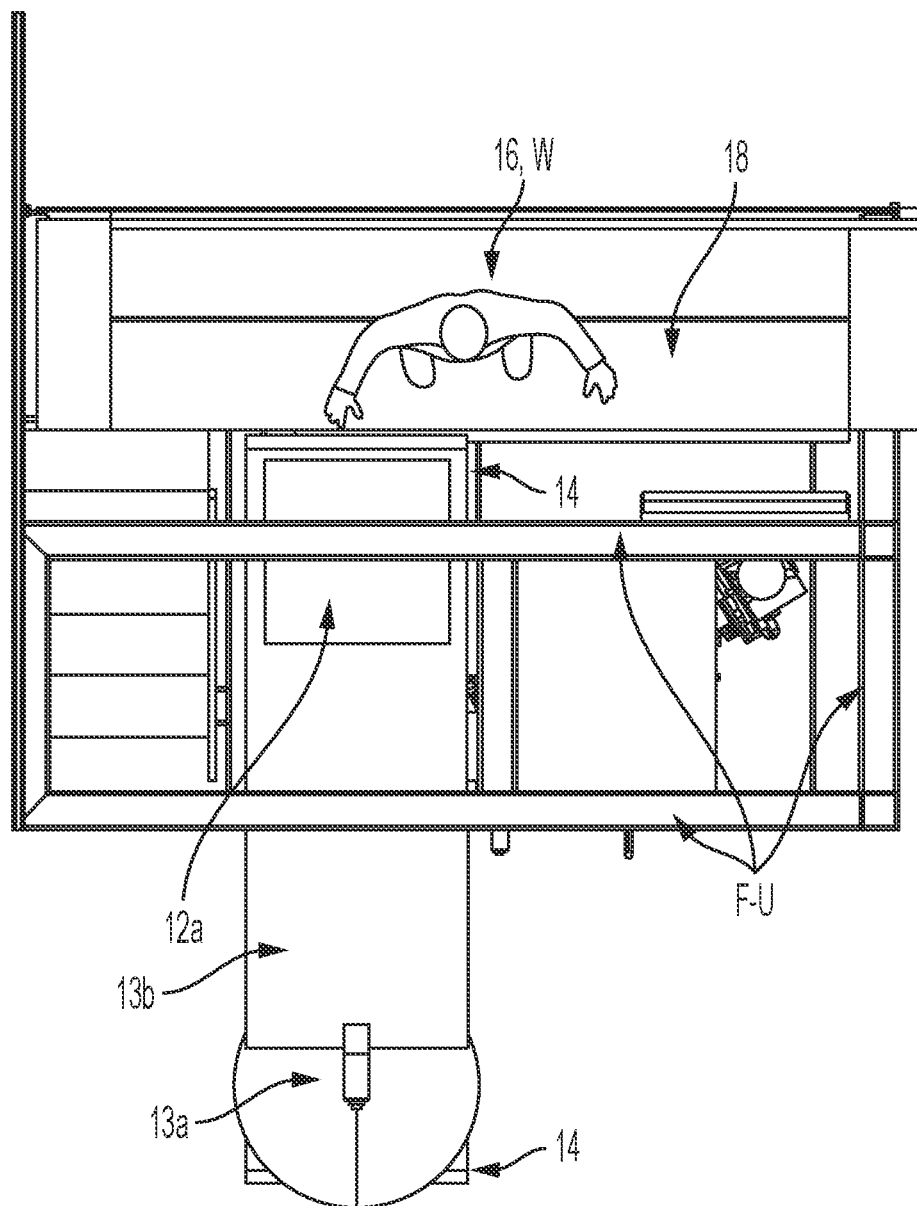
FIG. 19 is a top plan view thereof.

With particular reference to FIGS. 8, 10 and 12, the robot is operable to move the robot end of arm conveyor 300 to a position adjacent said sort cell conveyor second end 406b, 506b, 606b with the package transport surface 300' aligned flush with said sort cell conveyor second end 406b, 506b, 606b whereby a package is movable from the sort cell conveyor second end onto the end of arm conveyor transport surface. The end of arm conveyor having opposite front and back ends with the end of arm conveyor having an upper package transport surface selectively movable back and forth between the end of arm conveyor front and back ends.

The robot is further operable in response to instruction received from the respective package identifier unit to move the robot end of arm conveyor to a position adjacent a selected one of the associated plurality of sorted package hand-off receivers (e.g., bins or conveyors).

The end of arm tool conveyor transport surface is operable to move the transport surface from the front end to the back end and place the sorted package into the selected one of the associated plurality of sorted package hand-off receivers.

The package sort cells are adapted for positioning on a floor; and where at least one of said package sort cells includes a platform lying along a plane spaced above the floor with said associated robot mounted to the floor The robot end of arm tool conveyor is movable between a position between the floor and plane and a position above and on the side of the plane opposite the floor.

The platform 18, P is moveable from a position parallel to said plane and a position perpendicular or parallel to said plane. For example, the platform may be lowered on a scissor frame when not in use.

The associated robot includes operating and non-operating conditions, wherein the platform is in the perpendicular position when the robot is in the non-operating condition and the platform is in the parallel position when the robot is in the operating position.

The platform is adapted to support a human standing thereon when in said parallel position.

The package sorting system may further comprise electronic controls operable (e . . . , via a GUI mounted or otherwise associated with a respective cell) to move the platform from the non-use to the use position, e.g., the perpendicular position to the parallel position, upon receiving a signal that the robot is in the non-operating position.

When in the non-operating condition, the robot including the end of arm tool conveyor is located in a position away from the out-feed conveyor so as to not interfere with the worker who has taken over moving sorted packages to the out-feed conveyor, e.g., a location between the floor or ceiling and the platform when in the in-use position.

As discussed above, and with reference to FIG. 1A, the robot associated with at least one of the plurality of package sort cells includes a robot arm and an end of arm tool 20a, the end of arm tool may comprise a carriage having a frame 7 and an end of frame conveyor 9, the frame 7 extending between and forming a space "S" between the robot end of arm 20b and the end of frame conveyor 9, the robot end of arm being movable to a position suspending the carriage therefrom, the end of frame conveyor 9 having opposite front and back ends 9a, 9b and an upper package transport surface 9c selectively movable back and forth between the end of frame conveyor front and back ends 9a and 9b, respectively.

The associated robot is operable to move the carriage end of frame conveyor to a position adjacent the sort cell out-feed conveyor second end with the package transport surface of the carriage end of frame conveyor aligned flush with the sort cell conveyor second end whereby a package is movable from the sort cell conveyor second end onto the end of frame conveyor transport surface.

The associated robot is operable in response to instruction received from a respective package identifier unit to move the associated robot end of frame conveyor to a position adjacent a selected one of the associated plurality of sorted package hand-off receivers.

The end of frame conveyor transport surface is operable to move the transport surface from the front end to the back end and place the sorted package into the selected one of the associated plurality of sorted package hand-off receivers.

Figure 20:
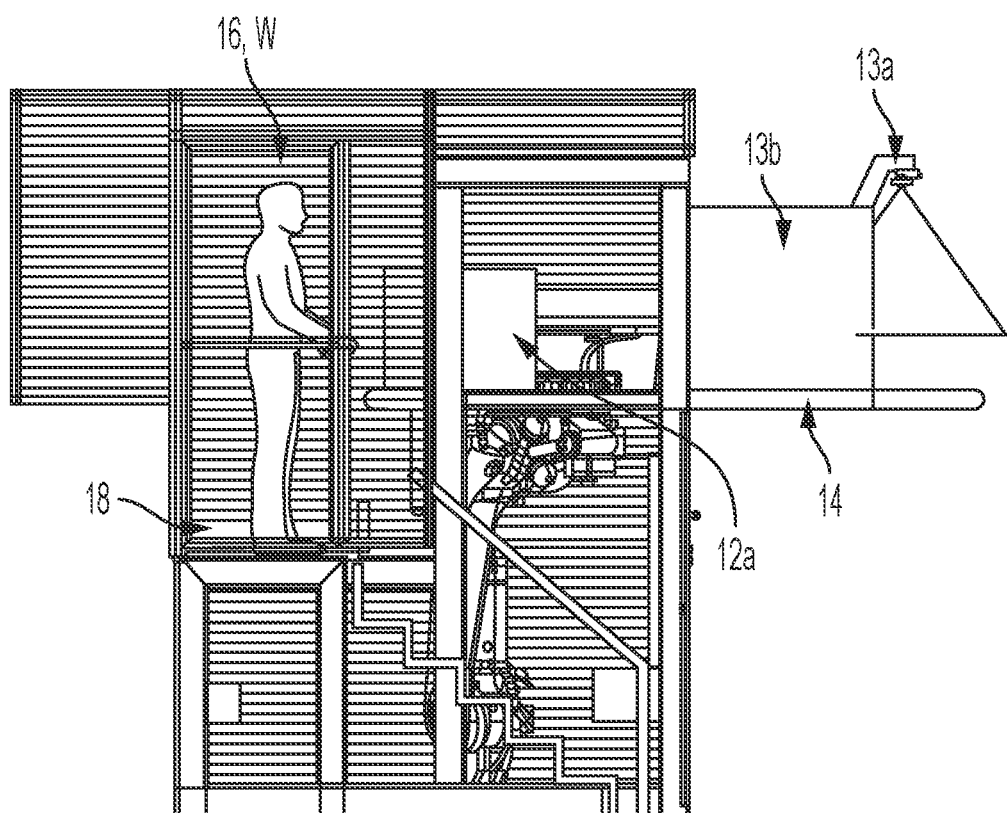
FIG. 20 is a side elevational view opposite the view of FIG. 17.
Figure 21:
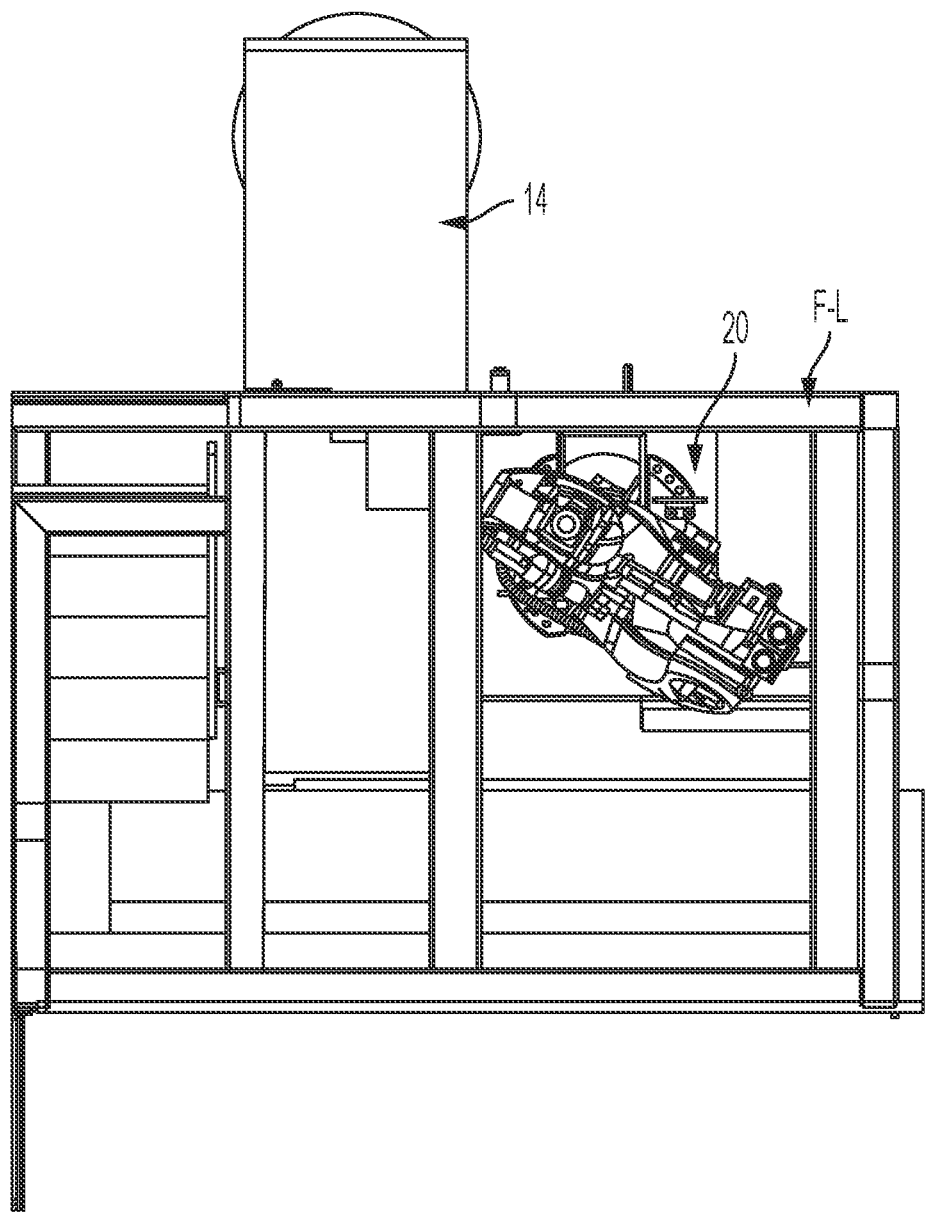
FIG. 21 is a bottom plan view thereof.
Figure 22:
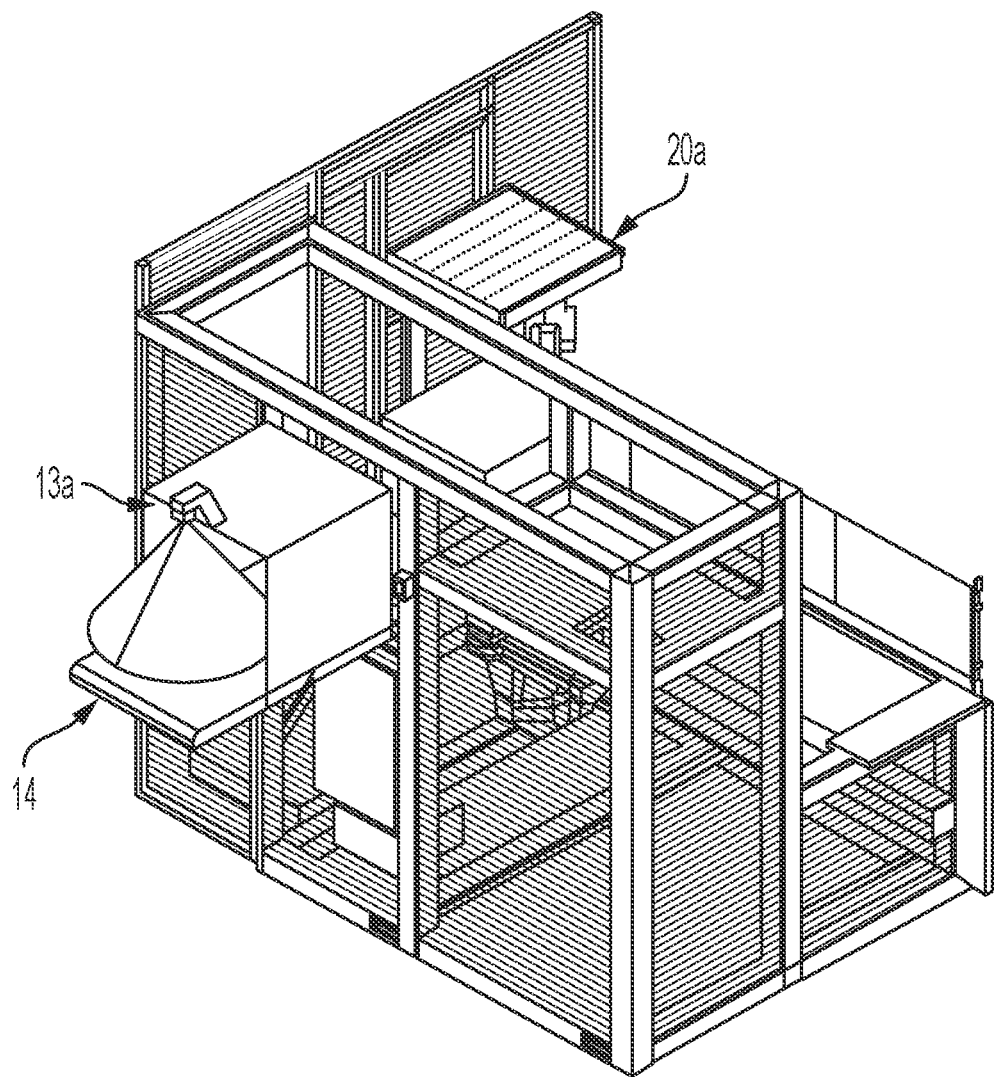
FIG. 22 is a perspective view of another embodiment of the invention.
Figure 23:
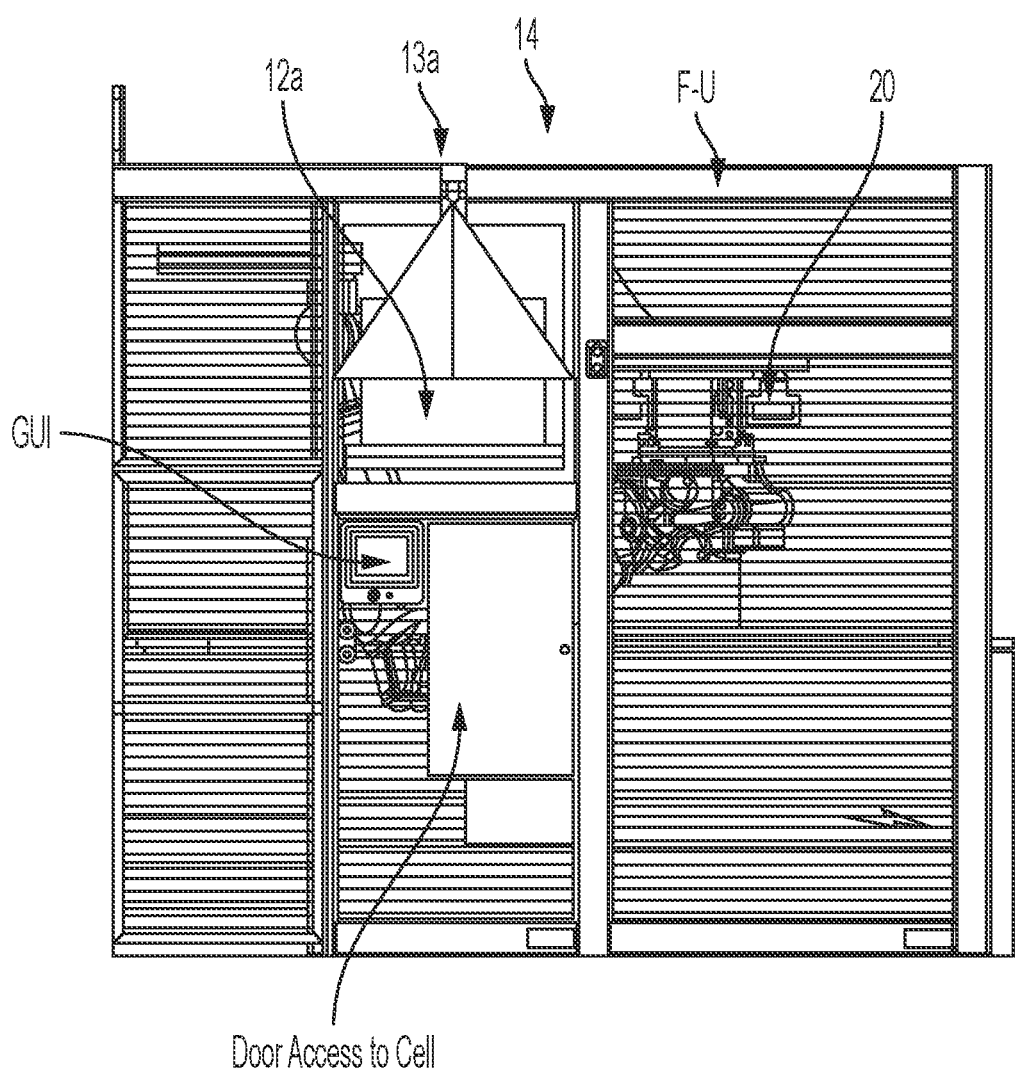
FIG. 23 is a front elevational view thereof.
Figure 24:
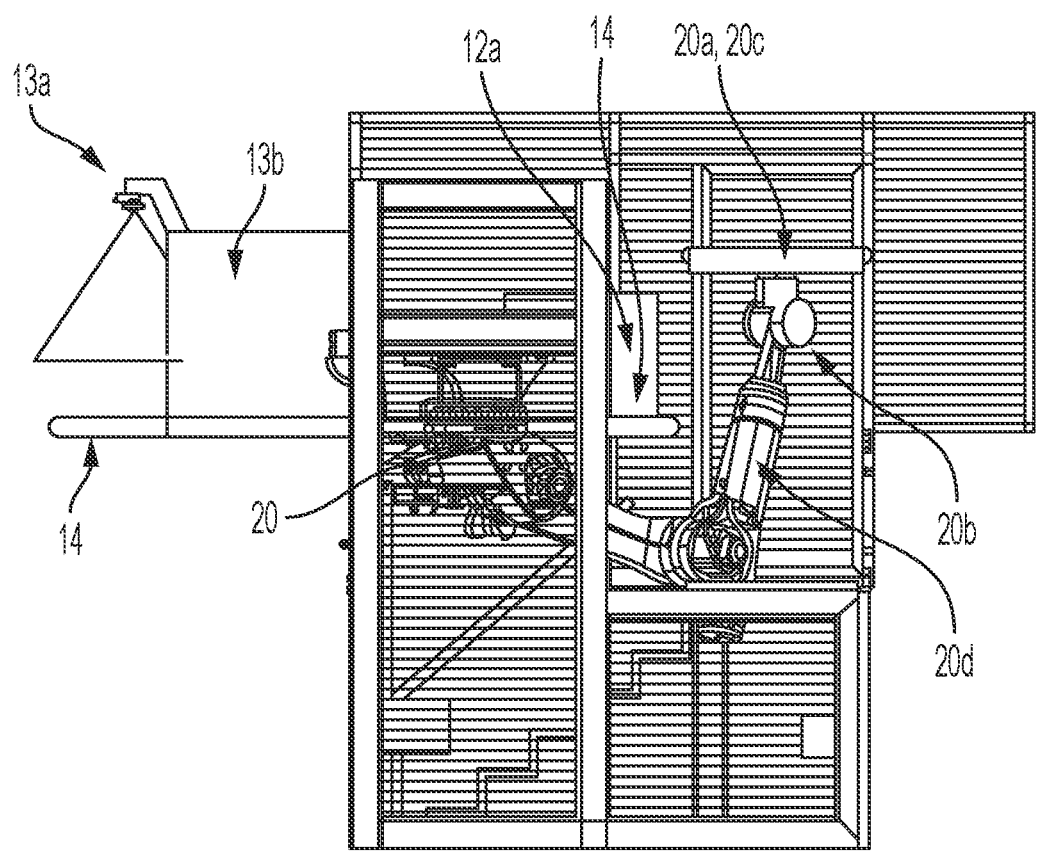
FIG. 24 is a side elevational view thereof.
Figure 25:
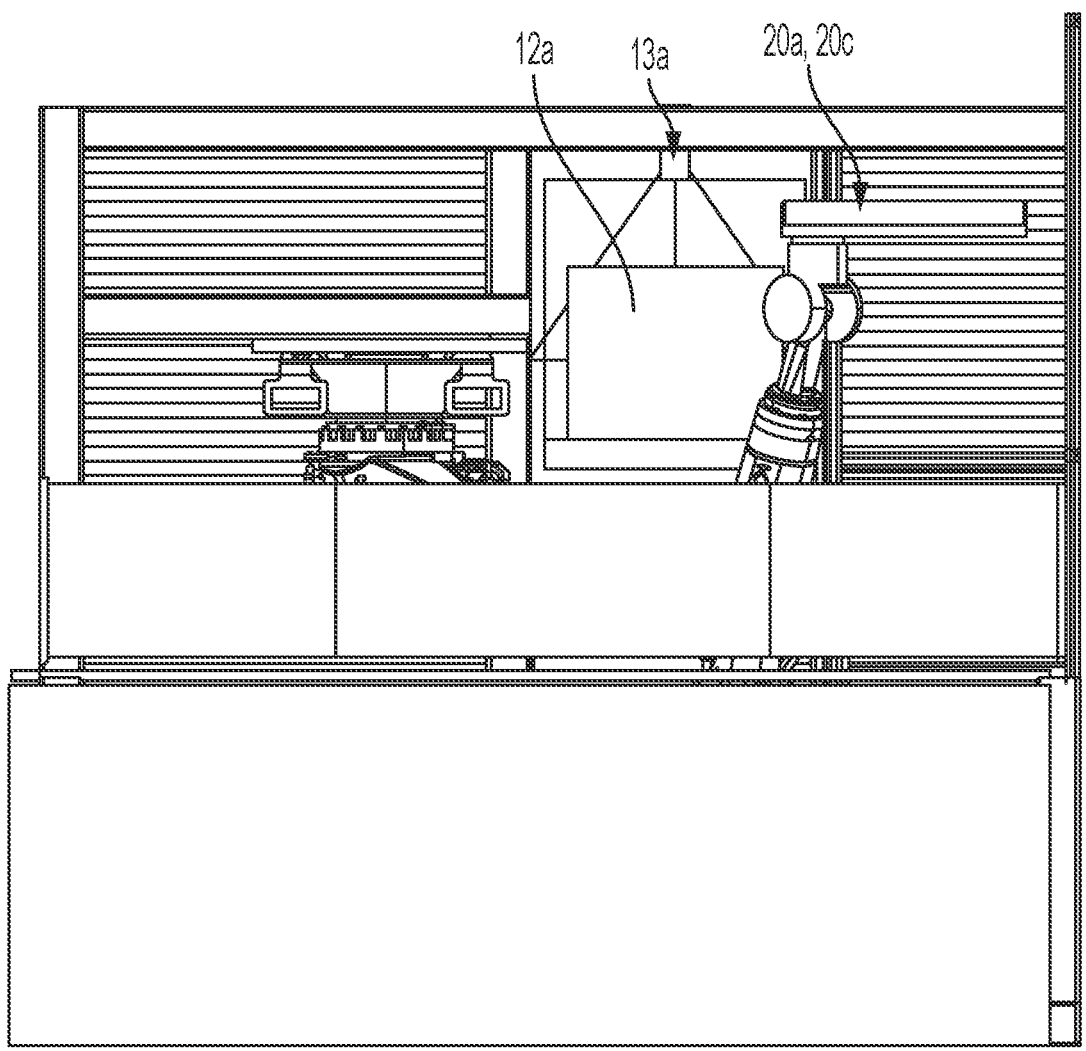
FIG. 25 is a rear elevational view thereof.
Figure 26:
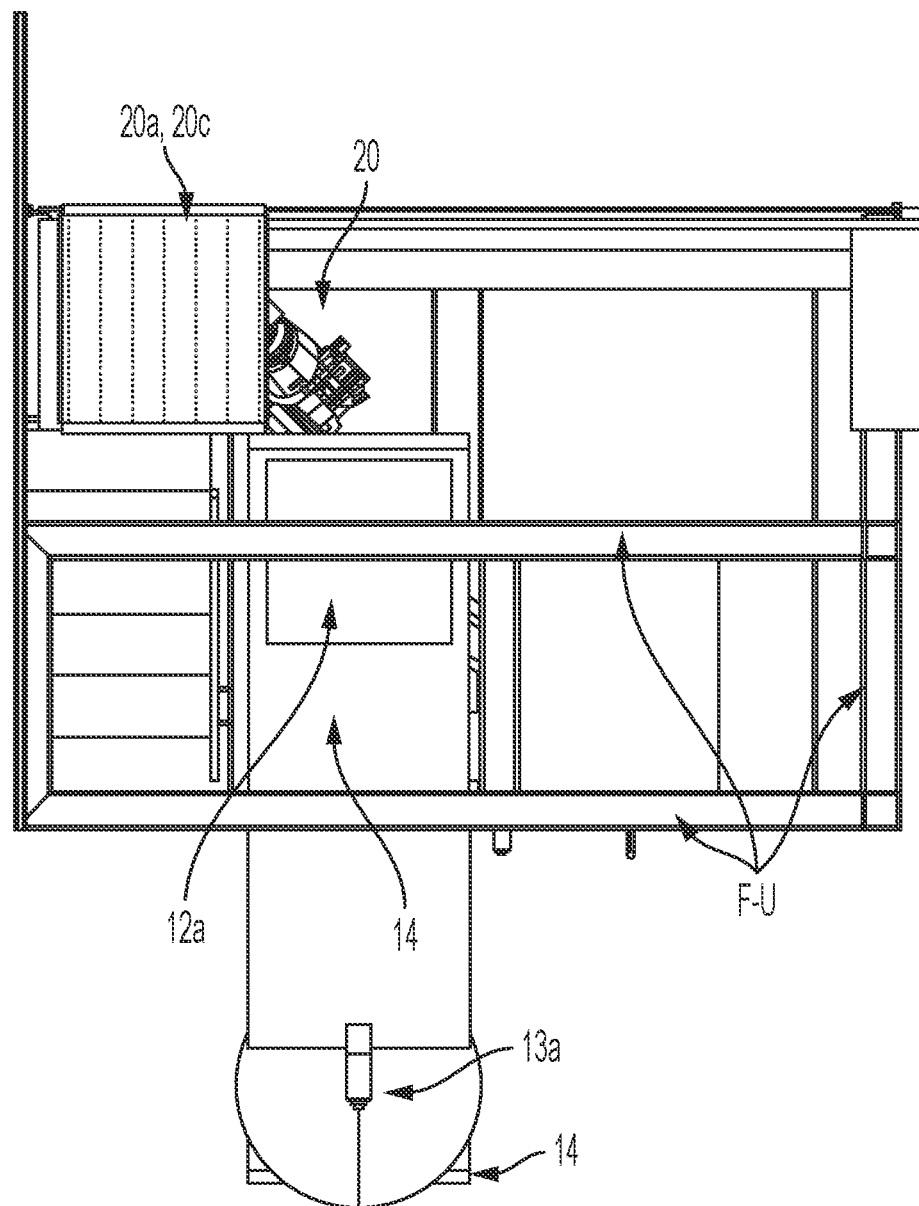
FIG. 26 is a top plan view thereof.
Figure 27:
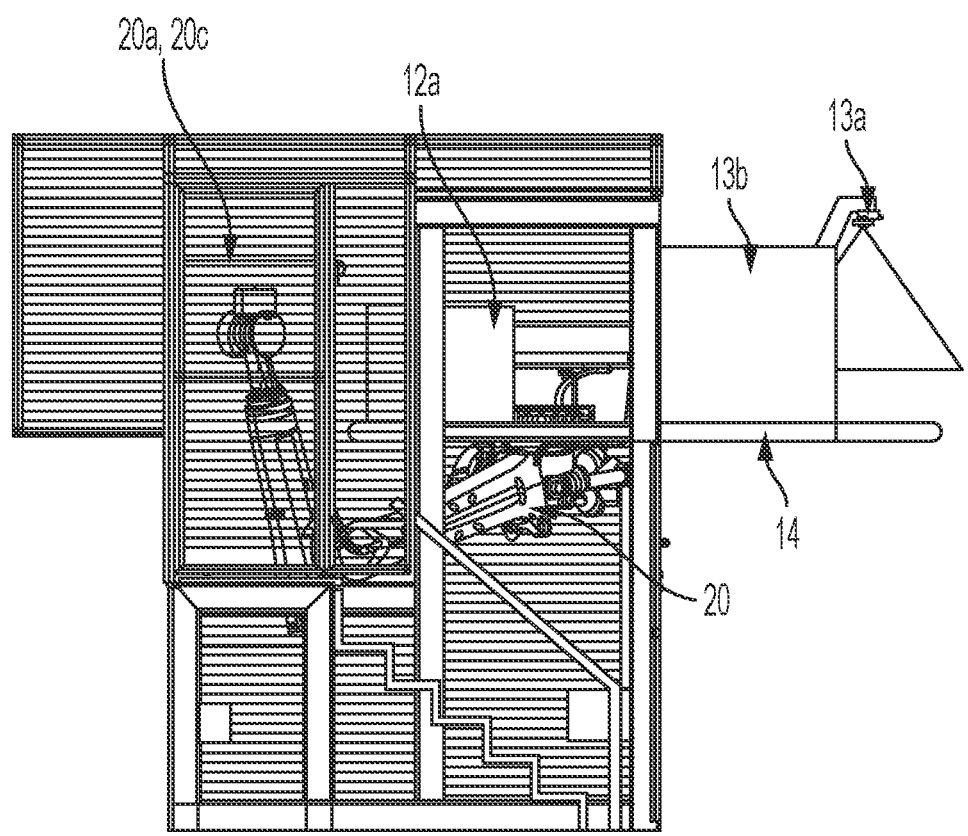
FIG. 27 is a side elevational view opposite the view of FIG. 24.
Figure 28:
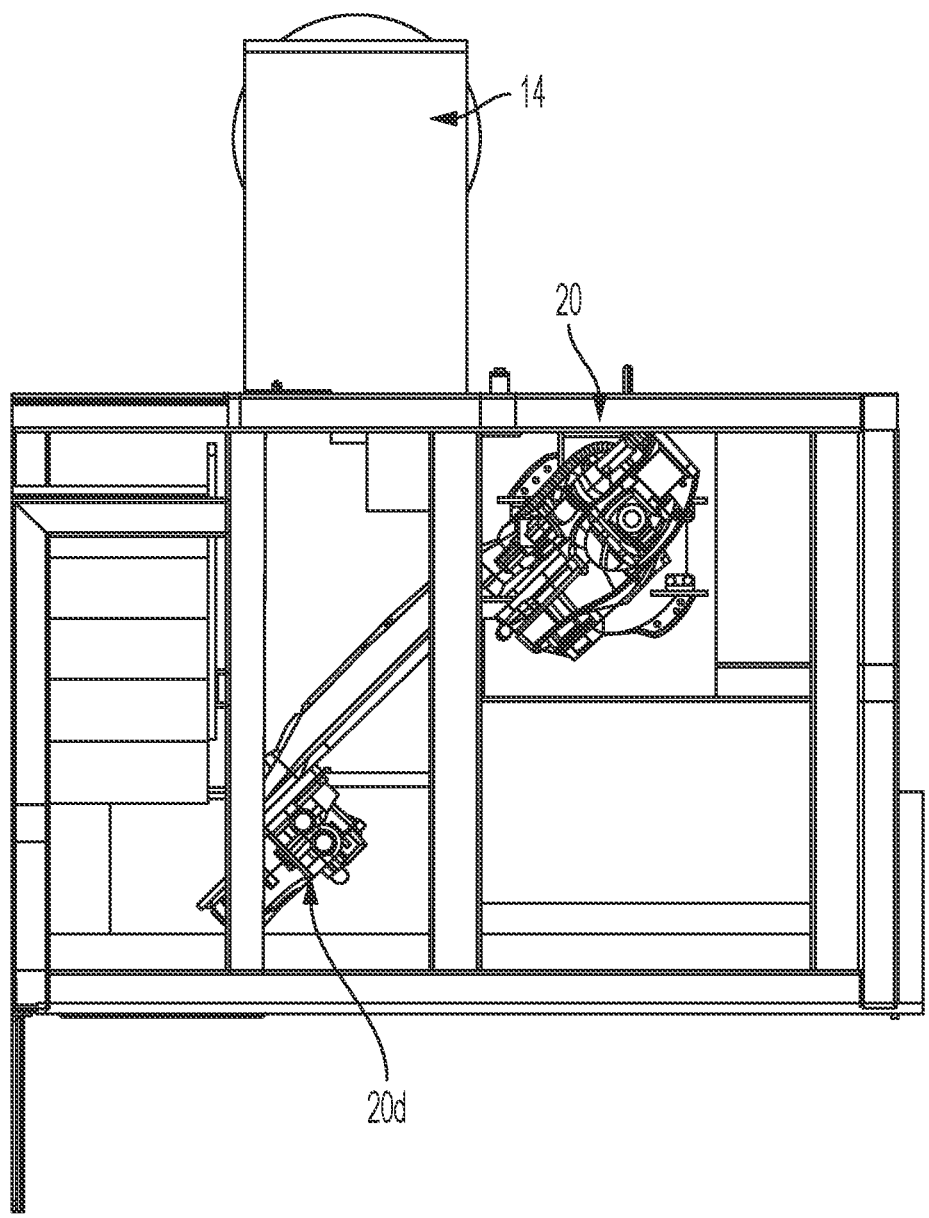
FIG. 28 is a bottom plan view thereof.

The plurality of package sort cells are adapted for positioning on a floor. The at least one of package sort cells includes a platform lying along a plane "PL" spaced above the floor (see FIG. 20).

The associated robot includes operating and non-operating conditions, and the robot end of frame conveyor is movable to a position lateral of said package sort cell conveyor when said associate robot is in said non-operating condition.

The platform P is adapted to support a human operator W standing thereon when said robot is in said non-operating position.

The package sorting system may include electronic controls operable to alert a human operator to take over the package moving function of the associated robot when the associated robot is in the non-operating condition.

The package sorting system may include a frame having an upper frame section, the associated robot mounted to the upper frame section.

Referring to the embodiment of FIG. 31, a worker "TW" in the truck trailer "T" loads the packages located in the trailer onto a conveyor "TC" which moves the packages out of the trailer to the respective sort cell. In a large package routing facility, many tractor trailers "T" are constantly arriving and leaving the facility to drop off packaging for sorting and/or pick up sorted packages for delivering to their next transit location (e.g., the package final destination or anther package sorting location). The trailers "T" may be arranged in side-by-side relation adjacent a respective package sort cell located in the sort aisle.

With continued reference to FIG. 31, in the case of an empty truck bay at a cell 500, a percentage of the packages to be sorted coming off of one or both of the trucks parked at the adjacent cells 400 and 600 may be diverted to cell 500 to increase the processing efficiency of the packages coming off trucks at cells 400 and 600. Thus, the quantity of packages coming off one truck may be directed to more than just the cell where the truck is parked.

In the embodiment of package sorting system seen in FIG. 31, a first diverting conveyor DC1 having first and second ends DC1A and DC1B is provided, respectively, the first diverting conveyor first end DC1A located adjacent the sort cell conveyor first end 406*a* associated with the first package sort cell 400, the first diverting conveyor second end DC1*b* located adjacent sort cell conveyor first end 506*a* of the second package sort cell 500 located adjacent the first package sort cell 400, whereby the first diverter conveyor DC1 is operable to transport one or more packages directed toward the first sort cell 400 to the sort conveyor first end 506*a* the second, adjacent sort cell 500.

The first diverter conveyor DC1 may further be operable to transport one or more packages directed toward the second, adjacent sort cell 500 to the sort conveyor first end of 406*a* of the first sort cell 400.

The sort cell system may further comprise a second diverting conveyor DC2 having first and second ends DC2A and DC2B, respectively, the second diverting conveyor first end DC2A located adjacent the first end 506*a* of said sort cell conveyor 506 of the second, adjacent sort cell 500, the second diverting conveyor second end DC2B located adjacent the sort cell conveyor first end 606*a* of a third package sort cell 600 located adjacent the second sort cell 500 on the side thereof opposite the first package sort cell 400, whereby the second diverting conveyor DC2 is operable to transport one or more packages directed toward the second package sort cell 500 to the sort cell conveyor 606 of the package third sort cell 600.

One or both of the first and second diverting conveyors DC1 and DC2 may be bidirectional depending on which truck bay is empty at any given time. Thus, should truck bay at cell 500 be occupied by a truck but the truck bay at cell 600 is empty, a percentage of packages may be diverted from cell 500, these diverted packages traveling from DC2A to DC2B.

The package sorting system may further comprise one or more transverse bi-directional conveyors such as first, second and third transverse bi-directional conveyors 450, 650, 750 positioned adjacent the first ends 406*a*, 506*a*, 606*a* of the first, second and third sort cell conveyors 406, 506, 606, respectively, the transverse bidirectional conveyors operable to move packages to be sorted to either its respective sort cell conveyor (along axis D-D$^1$, D-D$^2$ or D-D$^3$) or to the diverting conveyor DC1 or DC2 located at the respective package sort cell (along axis E-E which extends in spaced, parallel relation to axis A-A).

From the above, it will thus be appreciated that the diverting conveyors allow maximum package processing efficiencies when a truck bay is empty. Rather than the cell associated with the empty truck bay sitting idle, it is used to process packages coming off of adjacent cells through utilization of the diverting conveyors. Furthermore, should more than one truck bay be empty, packages from any in use sort cell may be diverted to more than one empty truck bay associated cell. For example, if the truck bays at each of cells 500 and 600 were empty, packages coming off the truck at cell 400 can be diverted to both cells 500 and 600. In particular, the transverse conveyor at cell 500 could operate to alternately pass packages to cell 500 and to cell 600. It will be appreciated that instead of using a transverse conveyor, another mechanism may be used to divert the packages to either one of cell 500 or cell 600 along DC2 such as a pusher arm, for example (not shown).

The conveyor onto which the packages are handed off from truck conveyor TC may include an unload conveyor UC1, UC2, UC3 which extends between the truck conveyor TC and transverse conveyor 450, 550 and 650, respectively. In an embodiment, the speeds of the individual conveyors may be independently controlled which is useful for package spacing purposes. For example, the speed of conveyor UC1 can be slowed or increased relative to the speeds of one or both conveyors 406 and DC1 so as to create the desired spacing between the packages on the respective conveyors. A robotic end of arm tool may comprise an upper package transport surface which is one or more of smooth, cleated and vacuum assisted, or any other desired configuration.

More than one robot arm may be included in a single cell to increase productivity.

Referring to Figs. FIG. 34*a*-34*f*, simplified side elevational views of package anti-tip mechanisms are shown which assist in preventing accidental tipping of a package as a package travels from the in-feed conveyor to the EOAT conveyor and to the out-feed conveyor as described above.

Figure 35A:
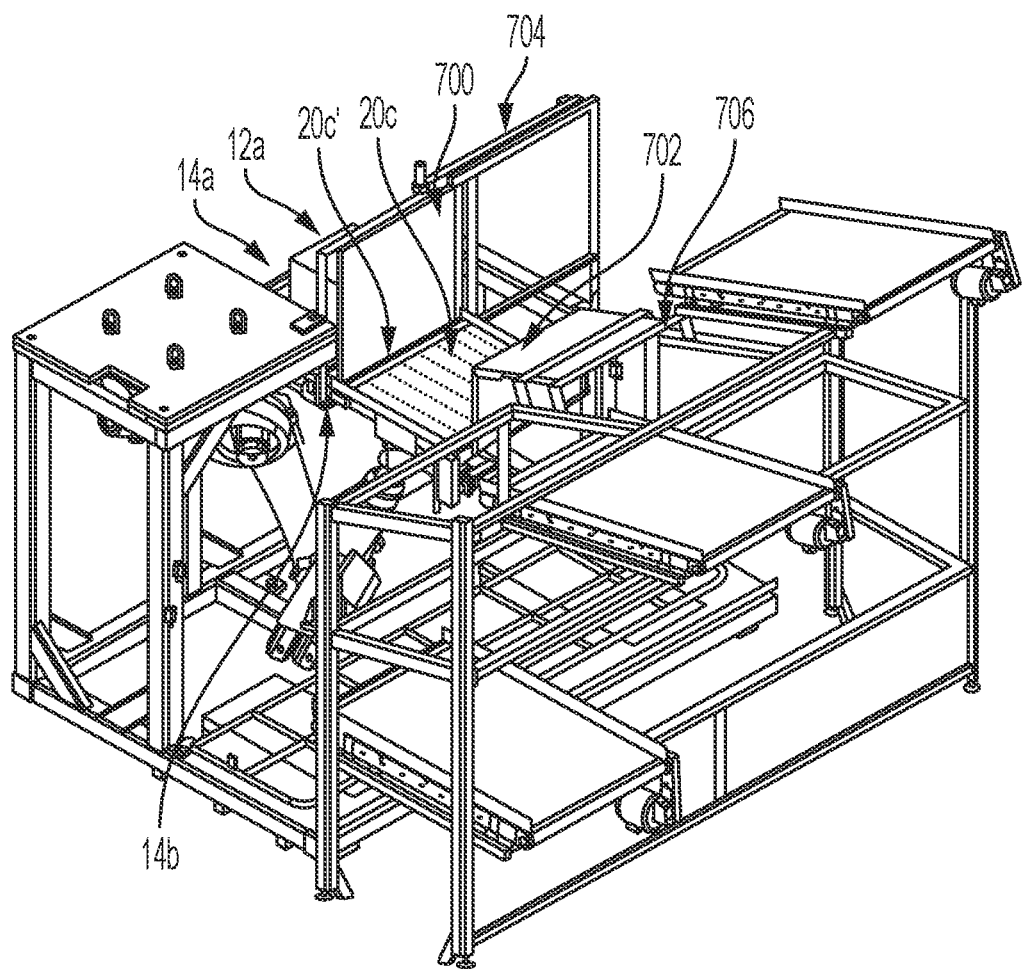
FIG. 35A is a right side perspective view of an embodiment of a sort cell including package anti-tip mechanisms at the in-feed conveyor and the out-feed side of the EOAT conveyor.
Figure 35B:
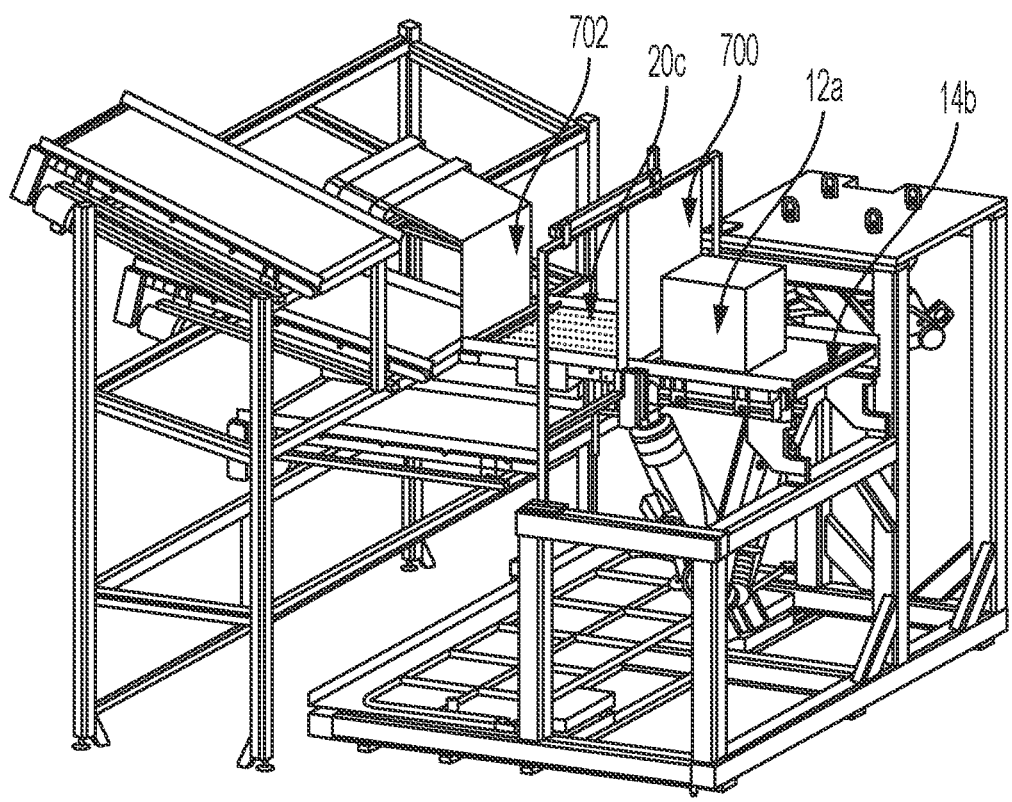
FIG. 35B is a left side perspective view of FIG. 35A.
Figure 35C:
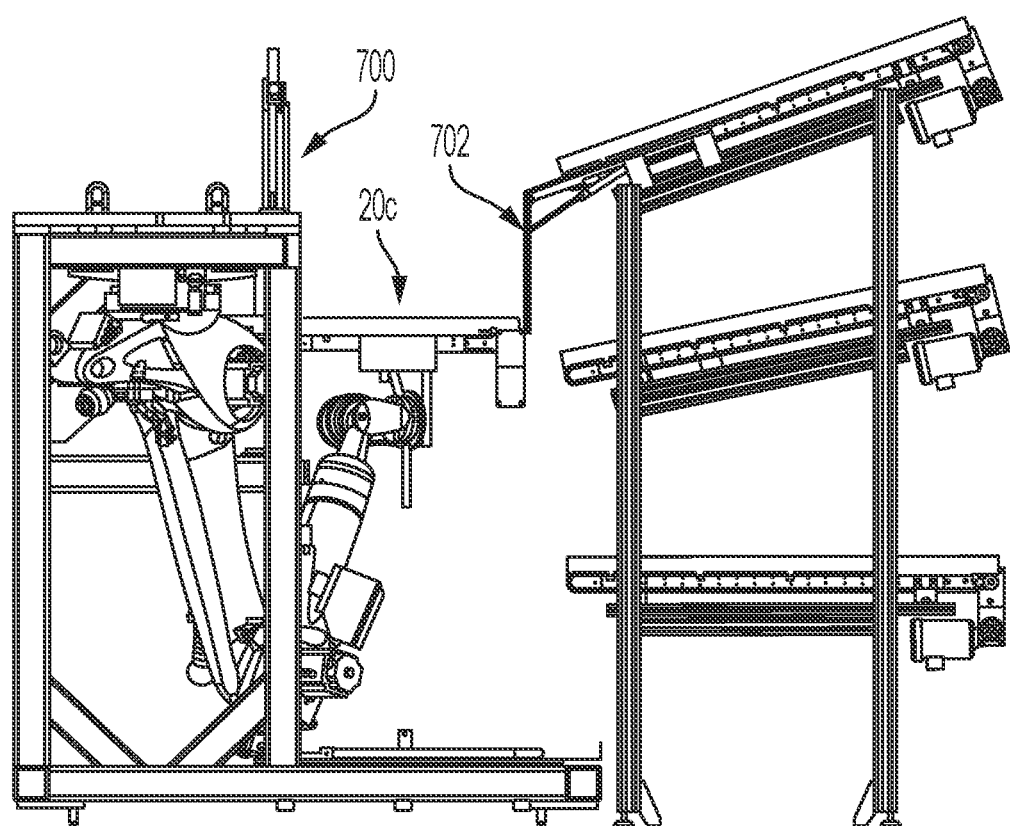
FIG. 35C is a left side elevational view thereof.
Figure 35D:
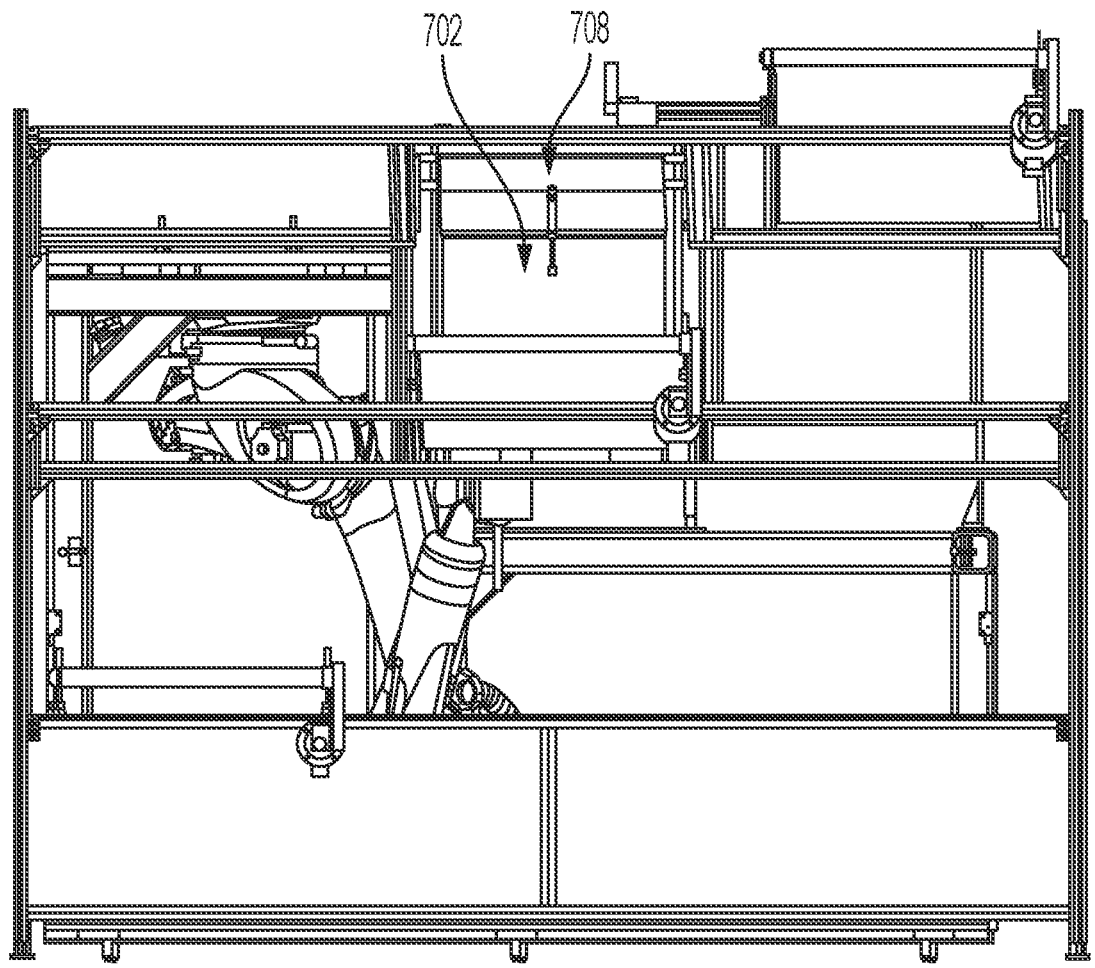
FIG. 35D is a rear elevational view thereof.
Figure 35E:
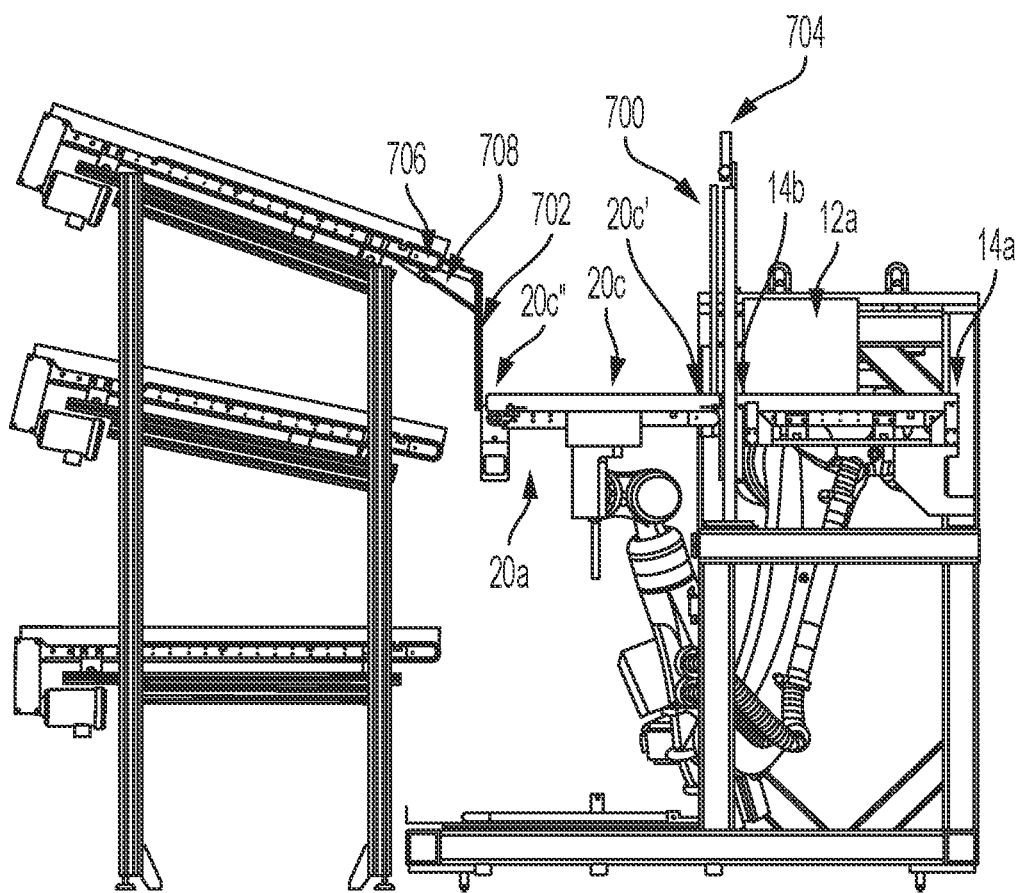
FIG. 35E is a right side elevational view thereof.
Figure 35F:
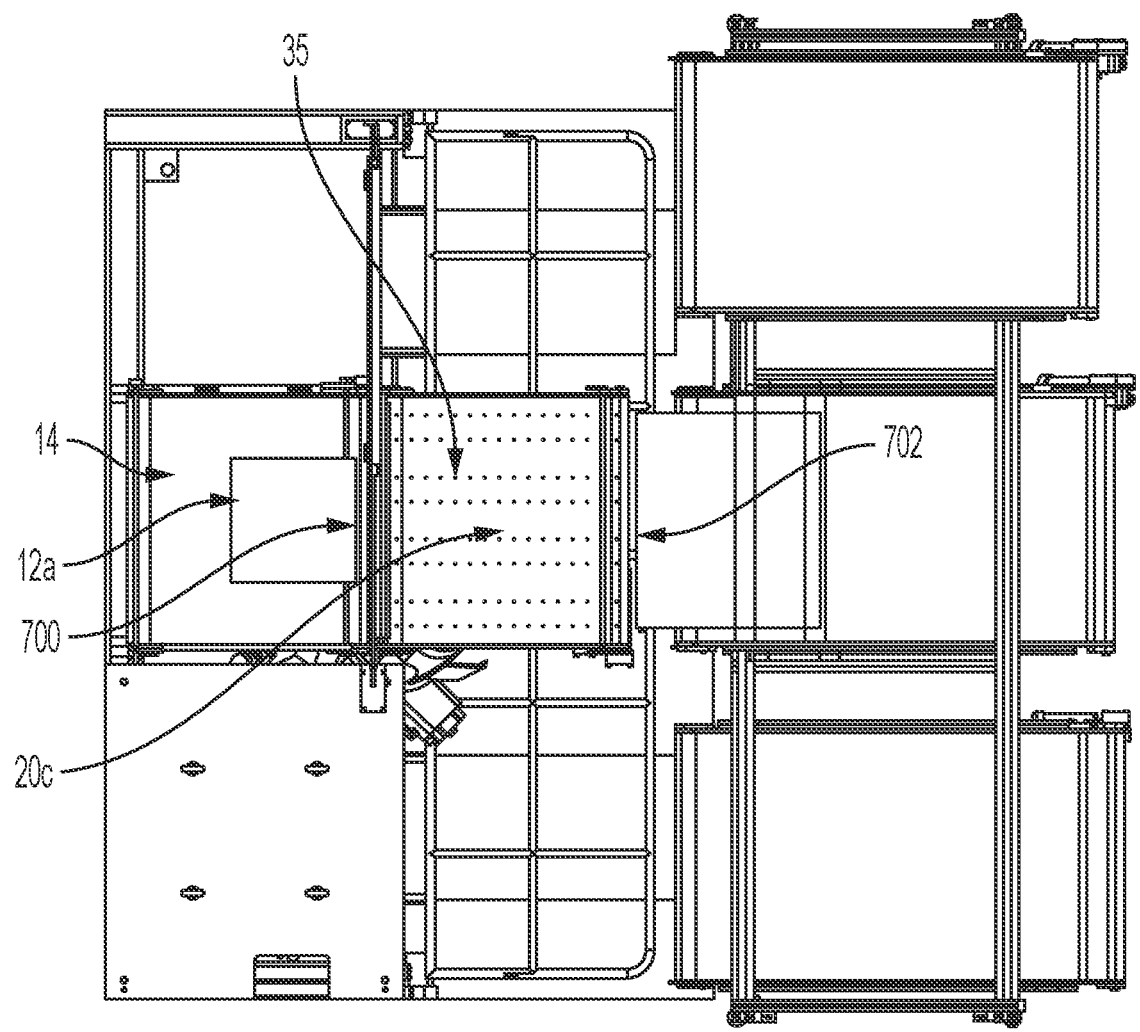
FIG. 35F is a top plan view thereof.
Figure 35G:
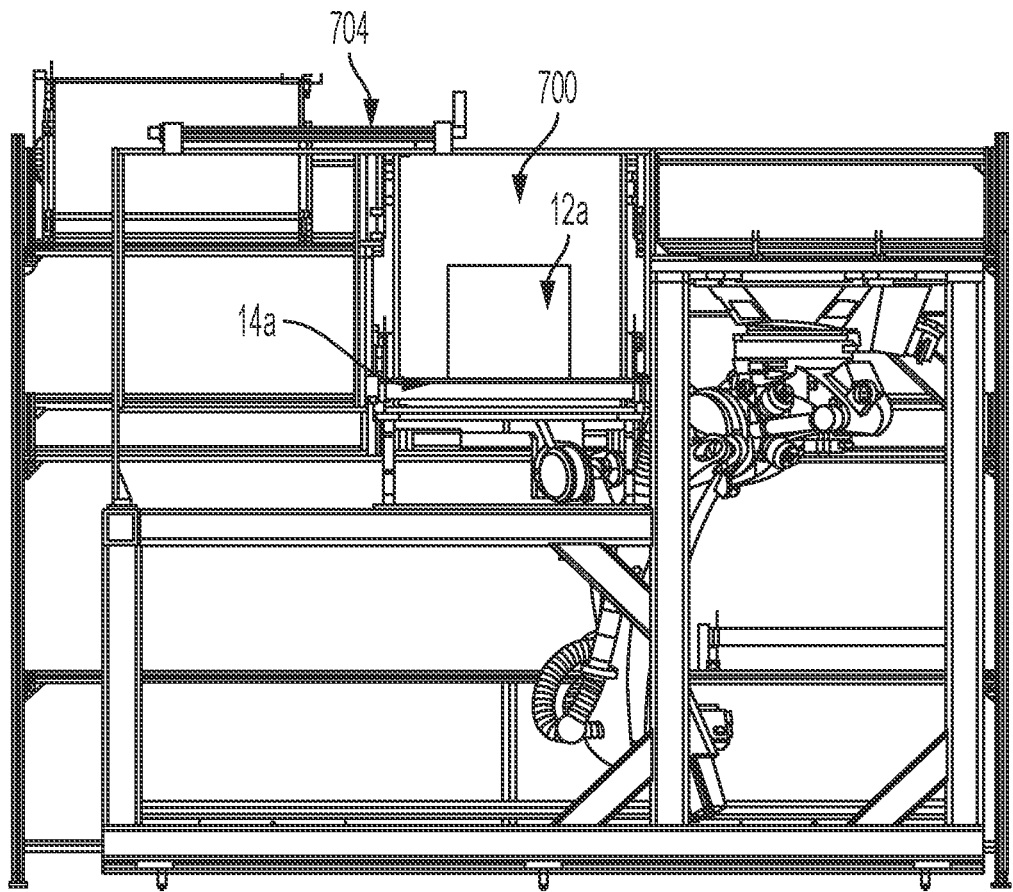
FIG. 35G is a front elevational view thereof.
Figure 35H:
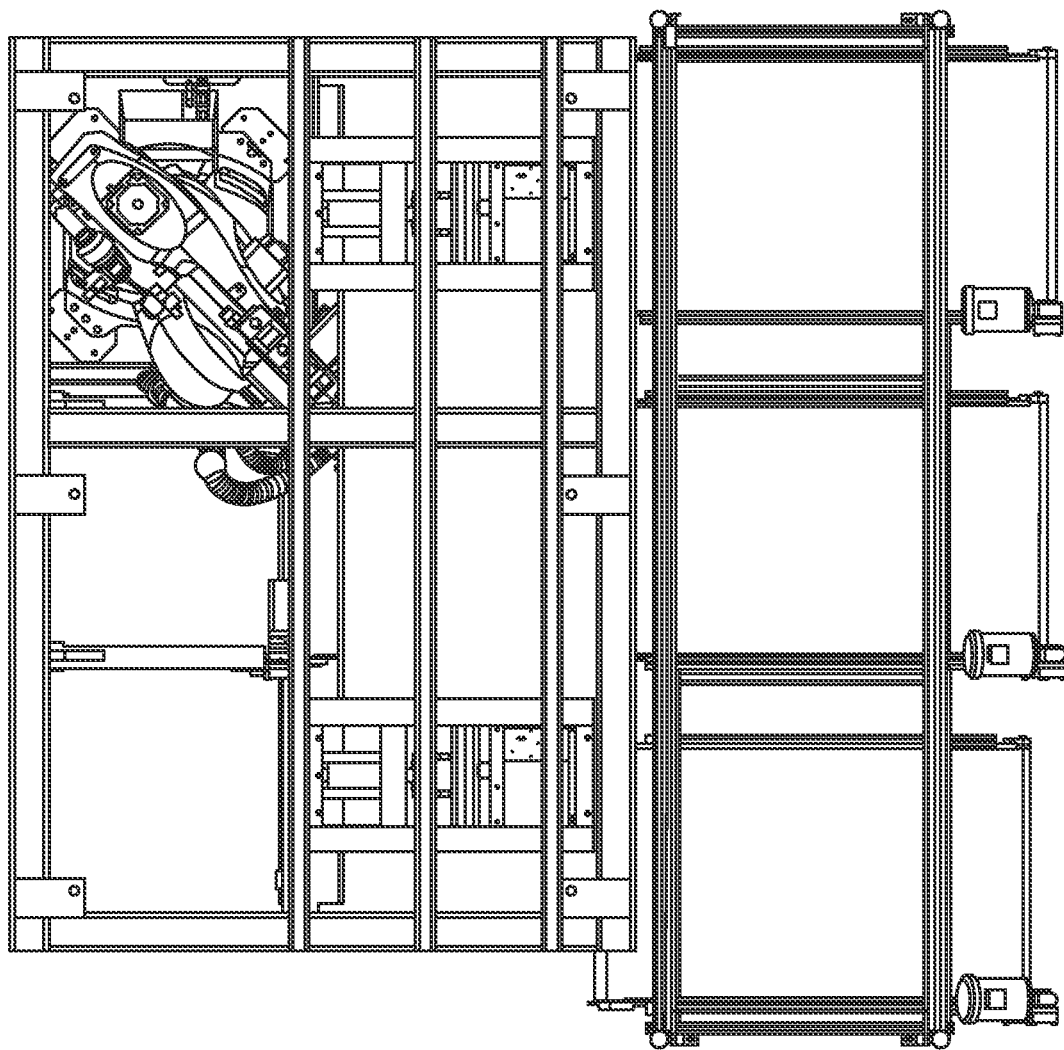
FIG. 35H is a bottom plan view thereof.

FIG. 35*a* is a right side perspective view of an embodiment of a sort cell including package anti-tip mechanisms at the in-feed conveyor and the out-feed side of the EOAT conveyor as described above.

Thus, in an embodiment, there is disclosed a package sorting system, comprising a plurality of package sort cells each having a respective robot operable to move packages from one location to another in response to instruction received from an electronic package identifier unit associated with a respective package sort sell, said plurality of package sort cells arranged in linearly spaced relation along a first axis defining a sorting aisle, each of said sort cells having opposite front and back sides and opposite right and left sides; a plurality of sorted package hand-off receivers associated with each one of said plurality of sort cells, each of said associated plurality of sorted hand off receivers arranged in linearly spaced relation along a second axis extending in spaced, parallel relation to said first axis and adjacent said back side of a respective said sort cell; a plurality of sort cell conveyors arranged in linearly spaced relation along a third axis extending in spaced, parallel relation to said first and second axes and adjacent said front side of each said sort cell; wherein each said sort cell conveyor includes opposite first and second conveyor ends extending along a respective fourth axis which passes through a respective sort cell and respective sorted package hand-off receivers, said fourth axis extending in perpendicular relation to said first, second and third axes; and wherein each said sort cell conveyor is operable to convey a package to be sorted from said first conveyor end to said second conveyor end with said second conveyor end located adjacent said front side of a respective said sort cell; and wherein the fourth axis associated with one respective sort cell lies in spaced, parallel relation to the fourth axis associated with another of said plurality of package sort cells; and wherein each said robot is operable to move packages one at a time from a respective said conveyor second end to a selected one of the respective said package hand-off receivers according to the instruction received from the respective said package identifier unit; and wherein each package sort cell and associated sorted package hand-off receivers and associated sort cell conveyor together form a single package sorting unit with each package sorting unit lying along its respective fourth axis.

In a further embodiment, the package sorting system robot associated with at least one of said plurality of package sort cells includes a robot arm and an end of arm conveyor mounted on said robot end of arm, said end of arm conveyor having opposite front and back ends with said end of arm conveyor having an upper package transport surface selectively movable back and forth between said end of arm conveyor front and back ends; whereby said robot is operable to move said robot end of arm conveyor to a position adjacent said sort cell conveyor second end with said package transport surface aligned flush with said sort cell conveyor second end whereby a package is movable from said sort cell conveyor second end onto said end of arm conveyor transport surface; whereby said associated robot is operable in response to instruction received from said respective package identifier unit to move said robot end of arm conveyor to a position adjacent a selected one of said associated plurality of sorted package hand-off receivers; and whereby said end of arm conveyor transport surface is operable to move said transport surface from said front end to said back end and place the sorted package into said selected one of said associated plurality of sorted package hand-off receiver.

In yet a further embodiment, the package sorting system wherein the package sort cells are adapted for positioning on a floor; and where at least one of said package sort cell includes a platform lying along a plane spaced above the floor with said associated robot mounted to the floor; whereby said robot end of arm conveyor is movable between a position between the floor and plane and a position above and on the side of the plane opposite the floor.

In yet another embodiment, the package sorting conveyor platform is moveable from a position parallel to said plane and a position perpendicular to said plane.

In yet another embodiment, the package sorting conveyor associated robot includes operating and non-operating conditions, wherein said platform is in said perpendicular position when said robot is in said non-operating condition and said platform is in said parallel position when said robot is in said operating position.

In yet another embodiment, the package sorting conveyor platform is adapted to support a human standing thereon when in said parallel position.

In yet another embodiment, the package sorting conveyor further comprises electronic controls operable to move said platform from said perpendicular position to said parallel position upon receiving a signal that said robot is in said non-operating position.

In yet a further embodiment, wherein when in said non-operating condition, said robot including said end of arm conveyor is located between the floor and said platform when in said perpendicular position.

In yet a further embodiment, wherein said robot associated with at least one of said plurality of package sort cells includes a robot arm and an end of arm tool, said end of arm tool comprising a carriage having a frame and an end of frame conveyor, said frame extending between and forming a space between said robot end of arm and said end of frame conveyor, said robot end of arm movable to a position suspending said carriage therefrom, said end of frame conveyor having opposite front and back ends and an upper package transport surface selectively movable back and forth between said end of frame conveyor front and back ends; whereby said associated robot is operable to move said carriage end of frame conveyor to a position adjacent said sort cell conveyor second end with said package transport surface of said carriage end of frame conveyor aligned flush with said sort cell conveyor second end whereby a package is movable from said sort cell conveyor second end onto said end of frame conveyor transport surface; whereby said associated robot is operable in response to instruction received from said respective package identifier unit to move said associated robot end of frame conveyor to a position adjacent a selected one of said associated plurality of sorted package hand-off receivers; and whereby said end of frame conveyor transport surface is operable to move said transport surface from said front end to said back end and place the sorted package into said selected one of said associated plurality of sorted package hand-off receiver.

In yet a further embodiment, wherein said plurality of package sort cells are adapted for positioning on a floor; and where said at least one of said package sort cells includes a platform lying along a plane spaced above the floor.

In yet a further embodiment, wherein said associated robot includes operating and non-operating conditions, and whereby said robot end of frame conveyor is movable to a position lateral of said package sort cell conveyor when said associate robot is in said non-operating condition.

In yet a further embodiment, wherein said platform is adapted to support a human operator standing thereon when said robot is in said non-operating position.

In yet a further embodiment, further comprising electronic controls operable to alert a human operator to take over the package moving function of the said associated robot when said associated robot is in said non-operating condition.

In yet a further embodiment, further comprising a frame having an upper frame section, said associated robot mounted to said upper frame section.

In yet a further embodiment, further comprising a first diverting conveyor having first and second ends, said first diverting conveyor first end located adjacent said sort cell conveyor first end associated with a first package sort cell, said first diverting conveyor second end located adjacent said sort cell conveyor first end of a second package sort cell located adjacent said first package sort cell, whereby said first diverter conveyor is operable to transport one or more packages directed toward said first sort cell to said sort conveyor first end of said second, adjacent sort cell.

In yet a further embodiment, whereby said first diverter conveyor is further operable to transport one or more packages directed toward said second, adjacent sort cell to said sort conveyor first end of said first sort cell, and further comprising a second diverting conveyor having first and second ends, said second diverting conveyor first end located adjacent said first end of said sort cell conveyor of said second, adjacent sort cell, said second diverting conveyor second end located adjacent said sort cell conveyor first end of a third package sort cell located adjacent said second sort cell on the side thereof opposite said first package sort cell, whereby said second diverting conveyor is operable to transport one or more packages directed toward said second package sort cell to said sort cell conveyor of said package third sort cell.

In yet a further embodiment, the first and second diverting conveyors are bidirectional.

In yet a further embodiment, first, second and third transverse bi-directional conveyors may be positioned adjacent said first end of said first, second and third sort cell conveyors, respectively, said transverse bidirectional conveyors operable to move packages to be sorted to either the sort sell conveyor or the diverting conveyor located at a respective said package sort cell.

In yet a further embodiment, a robotic end of arm tool comprising a robot arm and an end of arm conveyor mounted on said robot end of arm, said end of arm conveyor having opposite front and back ends with said end of arm conveyor having an upper package transport surface movable from said end of arm conveyor front end to said end of arm conveyor back end and operable to receive a package at said front end of said end of arm conveyor, and operable to hand off the package from said back end of said end of arm conveyor, and wherein said upper package transport surface is one or more of smooth, cleated and vacuum assisted.

In yet a further embodiment, a robotic end of arm tool comprising a carriage having a frame and an end of frame conveyor, said frame extending between and forming a space between said robot end of arm and said end of frame conveyor, said robot end of arm movable to a position suspending said carriage therefrom, said end of frame conveyor having opposite front and back ends and an upper package transport surface movable from said end of frame conveyor front end to said end of frame conveyor back end, and operable to receive a package at said front end of said end of frame conveyor and convey and hand off the package from said back end of said end of frame conveyor, and wherein said upper package transport surface is one or more of smooth, cleated and vacuum assisted.

In yet a further embodiment, the robotic end of arm tool further comprising a sort cell having a sort cell conveyor and a plurality of sorted package hand off receivers associated with said sort cell and sort cell conveyor, said robot arm movable between said sort cell conveyor and each one of said plurality of sorted package hand off receivers.

In yet a further embodiment, the robotic end of arm tool robot arm is movable to align said upper package transport surface with said sort cell conveyor whereupon a package may be transported from said sort cell conveyor onto said upper transport surface.

In yet a further embodiment, the robotic end of arm tool and further comprising a sort cell having a sort cell conveyor and a plurality of sorted package hand off receivers associated with said sort cell and sort cell conveyor, said robot arm movable between said sort cell conveyor and each one of said plurality of sorted package hand off receivers.

In yet a further embodiment, the robotic end of arm tool wherein said robot arm is movable to align said upper package transport surface with said sort cell conveyor whereupon a package may be transported from said sort cell conveyor onto said upper transport surface.

In yet a further embodiment, the package sorting system further comprising a first package anti-tipping mechanism movable between a package anti-tipping position and an out of the way position, said first package anti-tipping mechanism positioned adjacent said sort cell conveyor second end, said first package anti-tipping mechanism moving into said package anti-tipping position in response to a package arriving at said sort cell conveyor second end.

In yet a further embodiment, the package sorting system further comprising a second package anti-tipping mechanism movable between a package anti-tipping position and an out of the way position, said second package anti-tipping mechanism positioned adjacent one of said package hand off receivers, said second package anti-tipping mechanism moving into said package anti-tipping position in response to a package arriving at said back end of said end of arm conveyor.

In yet a further embodiment, wherein first and second anti-tipping mechanisms move into the out of the way position in response to said sort cell conveyor and said end of arm tool conveyor coming to a stop, respectively.

In yet a further embodiment, further comprising a first package anti-tipping mechanism movable between a package anti-tipping position and an out of the way position, said first package anti-tipping mechanism positioned adjacent said sort cell conveyor second end, said first package anti-tipping mechanism moving into said package anti-tipping position in response to a package arriving at said sort cell conveyor second end.

In yet a further embodiment, further comprising a second package anti-tipping mechanism movable between a package anti-tipping position and an out of the way position, said second package anti-tipping mechanism positioned adjacent one of said package hand off receivers, said second package anti-tipping mechanism moving into said package anti-tipping position in response to a package arriving at said back end of said end of frame conveyor.

In yet a further embodiment, the package sorting system may further include first and second anti-tipping mechanisms operable to move into the out of the way position in response to said sort cell conveyor and said end of frame conveyor coming to a stop, respectively.

While the invention has been described with regard to particular embodiments thereof, it is understood that other configurations and embodiments are possible and the invention is not limited to the embodiments shown and described herein.

What is claimed is:

1. A package sorting system, comprising:
   a) a plurality of package sort cells each having a respective robot operable to move packages from one location to another in response to instruction received from an electronic package identifier unit associated with a respective package sort cell,
   said plurality of package sort cells arranged in linearly spaced relation along a first axis defining a sorting aisle,
   each of said sort cells having opposite front and back sides and opposite right and left sides;
   b) a plurality of sorted package hand-off receivers associated with each one of said plurality of sort cells, each of said associated plurality of sorted hand off receivers arranged in linearly spaced relation along a second axis extending in spaced, parallel relation to said first axis and adjacent said back side of a respective said sort cell;
   c) a plurality of sort cell conveyors arranged in linearly spaced relation along a third axis extending in spaced, parallel relation to said first and second axes and adjacent said front side of each said sort cell;
   wherein each said sort cell conveyor includes opposite first and second conveyor ends extending along a respective fourth axis which passes through a respective sort cell and respective sorted package hand-off receivers,
   said fourth axis extending in perpendicular relation to said first, second and third axes; and
   wherein each said sort cell conveyor is operable to convey a package to be sorted from said first conveyor end to said second conveyor end with said second conveyor end located adjacent said front side of a respective said sort cell; and
   wherein the fourth axis associated with one respective sort cell lies in spaced, parallel relation to the fourth axis associated with another of said plurality of package sort cells; and wherein each said robot is operable to move packages one at a time from a respective said conveyor second end to a selected one of the respective said package hand-off receivers according to the instruction received from the respective said package identifier unit; and wherein each package sort cell and associated sorted package hand-off receivers and associated sort cell conveyor together form a single package sorting unit with each package sorting unit lying along its respective fourth axis.

2. The package sorting system of claim 1, wherein said robot associated with at least one of said plurality of package sort cells includes a robot arm and an end of arm conveyor mounted on said robot end of arm, said end of arm conveyor having opposite front and back ends with said end of arm conveyor having an upper package transport surface selectively movable back and forth between said end of arm conveyor front and back ends;

whereby said robot is operable to move said robot end of arm conveyor to a position adjacent said sort cell conveyor second end with said package transport surface aligned flush with said sort cell conveyor second end whereby a package is movable from said sort cell conveyor second end onto said end of arm conveyor transport surface;

whereby said associated robot is operable in response to instruction received from said respective package identifier unit to move said robot end of arm conveyor to a position adjacent a selected one of said associated plurality of sorted package hand-off receivers; and whereby said end of arm conveyor transport surface is operable to move said transport surface from said front end to said back end and place the sorted package into said selected one of said associated plurality of sorted package hand-off receiver.

3. The package sorting system of claim 2 wherein said plurality of package sort cells are adapted for positioning on a floor; and where at least one of said package sort cell includes a platform lying along a plane spaced above the floor with said associated robot mounted to the floor;

whereby said robot end of arm conveyor is movable between a position between the floor and plane and a position above and on the side of the plane opposite the floor.

4. The package sorting conveyor of claim 3 wherein said platform is moveable from a position parallel to said plane and a position perpendicular to said plane.

5. The package sorting conveyor of claim 4 wherein said associated robot includes operating and non-operating conditions, wherein said platform is in said perpendicular position when said robot is in said non-operating condition and said platform is in said parallel position when said robot is in said operating position.

6. The package sorting conveyor of claim 5 wherein said platform is adapted to support a human standing thereon when in said parallel position.

7. The package sorting conveyor of claim 6 and further comprising electronic controls operable to move said platform from said perpendicular position to said parallel position upon receiving a signal that said robot is in said non-operating position.

8. The package sorting conveyor of claim 7 wherein when in said non-operating condition, said robot including said end of arm conveyor is located between the floor and said platform when in said perpendicular position.

9. The package sorting conveyor of claim 1 wherein said robot associated with at least one of said plurality of package sort cells includes a robot arm and an end of arm tool, said end of arm tool comprising a carriage having a frame and an end of frame conveyor, said frame extending between and forming a space between said robot end of arm and said end of frame conveyor, said robot end of arm movable to a position suspending said carriage therefrom, said end of frame conveyor having opposite front and back ends and an upper package transport surface selectively movable back and forth between said end of frame conveyor front and back ends;

whereby said associated robot is operable to move said carriage end of frame conveyor to a position adjacent said sort cell conveyor second end with said package transport surface of said carriage end of frame conveyor aligned flush with said sort cell conveyor second end whereby a package is movable from said sort cell conveyor second end onto said end of frame conveyor transport surface;

whereby said associated robot is operable in response to instruction received from said respective package identifier unit to move said associated robot end of frame conveyor to a position adjacent a selected one of said associated plurality of sorted package hand-off receivers; and whereby said end of frame conveyor transport surface is operable to move said transport surface from said front end to said back end and place the sorted package into said selected one of said associated plurality of sorted package hand-off receiver.

10. The package sorting system of claim 9 wherein said plurality of package sort cells are adapted for positioning on a floor; and where said at least one of said package sort cells includes a platform lying along a plane spaced above the floor.

11. The package sorting conveyor of claim 10 wherein said associated robot includes operating and non-operating conditions, and whereby said robot end of frame conveyor is movable to a position lateral of said package sort cell conveyor when said associate robot is in said non-operating condition.

12. The package sorting system of claim 11 wherein said platform is adapted to support a human operator standing thereon when said robot is in said non-operating position.

13. The package sorting system of claim 12 and further comprising electronic controls operable to alert a human operator to take over the package moving function of the said associated robot when said associated robot is in said non-operating condition.

14. The package sorting system of claim 13 and further comprising a frame having an upper frame section, said associated robot mounted to said upper frame section.

15. The package sorting system of claim 1 and further comprising a first diverting conveyor having first and second ends, said first diverting conveyor first end located adjacent said sort cell conveyor first end associated with a first package sort cell, said first diverting conveyor second end located adjacent said sort cell conveyor first end of a second package sort cell located adjacent said first package sort cell, whereby said first diverter conveyor is operable to transport one or more packages directed toward said first sort cell to said sort conveyor first end of said second, adjacent sort cell.

16. The package sorting system of claim 15 whereby said first diverter conveyor is further operable to transport one or more packages directed toward said second, adjacent sort cell to said sort conveyor first end of said first sort cell, and further comprising a second diverting conveyor having first and second ends, said second diverting conveyor first end located adjacent said first end of said sort cell conveyor of said second, adjacent sort cell, said second diverting conveyor second end located adjacent said sort cell conveyor first end of a third package sort cell located adjacent said second sort cell on the side thereof opposite said first package sort cell, whereby said second diverting conveyor is operable to transport one or more packages directed toward said second package sort cell to said sort cell conveyor of said package third sort cell.

17. The package sorting system of claim 16 wherein said first and second diverting conveyors are bidirectional.

18. The package sorting system of claim 16 and further comprising first, second and third transverse bi-directional conveyors positioned adjacent said first end of said first, second and third sort cell conveyors, respectively, said transverse bidirectional conveyors operable to move packages to be sorted to either the sort cell conveyor or the diverting conveyor located at a respective said package sort cell.

19. The package sorting system of claim 1 and further comprising a first package anti-tipping mechanism movable between a package anti-tipping position and an out of the way position, said first package anti-tipping mechanism positioned adjacent said sort cell conveyor second end, said first package anti-tipping mechanism moving into said package anti-tipping position in response to a package arriving at said sort cell conveyor second end.

20. The package sorting system of claim 19 and further comprising a second package anti-tipping mechanism movable between a package anti-tipping position and an out of the way position, said second package anti-tipping mechanism positioned adjacent one of said package hand off receivers, said second package anti-tipping mechanism moving into said package anti-tipping position in response to a package arriving at said back end of said end of arm conveyor.

21. The package sorting system of claim 20 wherein first and second anti-tipping mechanisms move into the out of the way position in response to said sort cell conveyor and said end of arm tool conveyor coming to a stop, respectively.

* * * * *